(12) United States Patent
Murray et al.

(10) Patent No.: US 6,262,129 B1
(45) Date of Patent: *Jul. 17, 2001

(54) METHOD FOR PRODUCING NANOPARTICLES OF TRANSITION METALS

(75) Inventors: Christopher Bruce Murray, New York; Shouheng Sun, Ossining, both of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,005

(22) Filed: Jul. 31, 1998

(51) Int. Cl.[7] ............... B01F 3/12; C09D 5/10; C09D 5/23
(52) U.S. Cl. ............ 516/33; 106/1.27; 252/62.55; 516/922
(58) Field of Search .......... 516/33, 922; 106/1.27; 252/62.55; 75/369, 374, 425, 722, 343

(56) References Cited

U.S. PATENT DOCUMENTS

| | | | |
|---|---|---|---|
| 3,180,835 | * | 4/1965 | Peri .......................... 516/33 |
| 3,531,413 | * | 9/1970 | Rosensweig ................ 516/33 X |
| 3,814,696 | * | 6/1974 | Verdone et al. ............ 516/33 |
| 4,006,047 | * | 2/1977 | Brummett et al. .......... 106/1.27 X |
| 4,063,000 | * | 12/1977 | Aonuma et al. ............ 252/62.55 X |
| 4,687,596 | * | 8/1987 | Borduz et al. .............. 252/62.55 X |
| 4,877,647 | * | 10/1989 | Klabunde ................... 516/33 |
| 5,147,841 | * | 9/1992 | Wilcoxon .................. 516/33 X |
| 5,160,452 | * | 11/1992 | Marutsuka et al. ......... 516/33 |
| 5,580,492 | * | 12/1996 | Bönnemann et al. ........ 516/33 |

FOREIGN PATENT DOCUMENTS

| | | | |
|---|---|---|---|
| 0 113 281 | * | 7/1984 | (EP) .................. 75/369 |
| 0 460 714 A2 | | 12/1991 | (EP) . |
| 0 686 448 A2 | | 12/1995 | (EP) . |
| 402309608 | * | 12/1990 | (JP) .................. 252/62.55 |

OTHER PUBLICATIONS

Murray, et al., "Self–Organization of CdSe Nanocrystallites into Three–Dimensional Quantum Dot Superlattices", Science, vol. 270, Nov. 24, 1995, pp. 1335–1338.

Toshima, et al., "Polymer–protected Palladium–Platinum Bimetallic Clusters: Preparation, Catalytic Properties and Structural Considerations", Chem. Soc. Faraday Trans., 1993, 89(14), pp. 2537–2543.

Toyoharu Hayashi, "Catalytic Applications of Gas Evaporated Ultra–Fine Particles", Ultra–Fine Particles: Exploratory Science and Technology, Noyes Publications, 1997, pp. 355–368.

Cain, J L, et al. "Preparation of Acicular Alpha–Fe Nanoparticles In Tubular Lecithin Colloids" IEEE Transactions on Magnetics, vol. 32, No. 5, Sep. 1, 1996. pp. 4490–4492.

Petit, C., et al. "Self–Organization of Magnetic Nonosized Cobalt Particles" Advanced Materials, vol. 10, No. 3, Feb. 11, 1998. pp. 259–261.

Sun, et al. "Synthesis of Monodisperse Cobalt Nanocrystals and their Assembly into Magnetic Superlattices (invited)" Journal of Applied Physics, vol. 85, No. 8, Apr. 15, 1999. pp. 4325–4330.

European Search Report, Branch at The Hague Search Division, May 22, 2000.

* cited by examiner

*Primary Examiner*—Richard D. Lovering
(74) *Attorney, Agent, or Firm*—McGinn & Gibb, PLLC

(57) ABSTRACT

A method of forming nanoparticles includes steps of forming a metal precursor solution from a transition metal, injecting the metal precursor solution to the surfactant solution, adding a flocculent to cause nanoparticles to precipitate out of solution without permanent agglomeration, and adding a hydrocarbon solvent to redisperse or repeptize the nanoparticles.

43 Claims, 16 Drawing Sheets

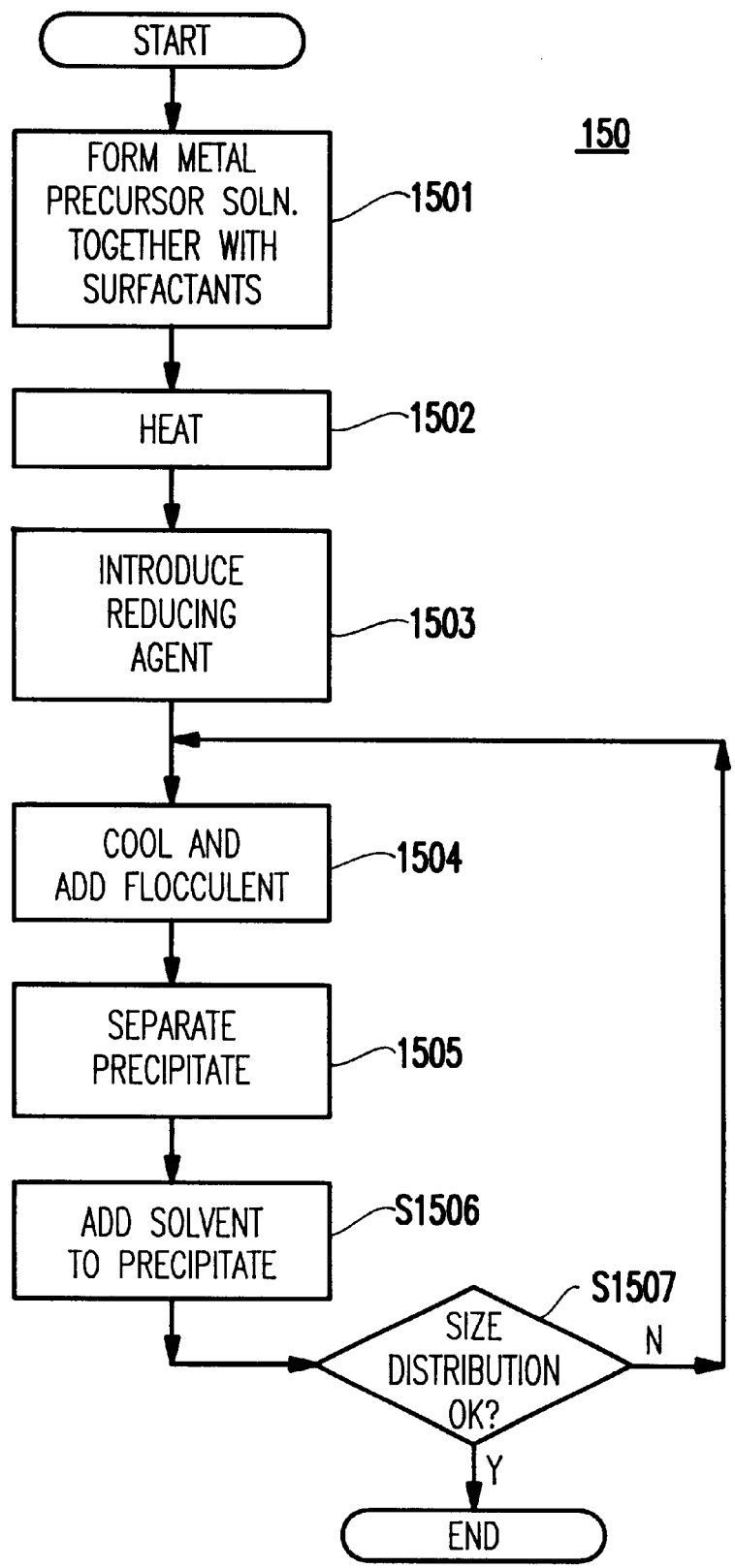

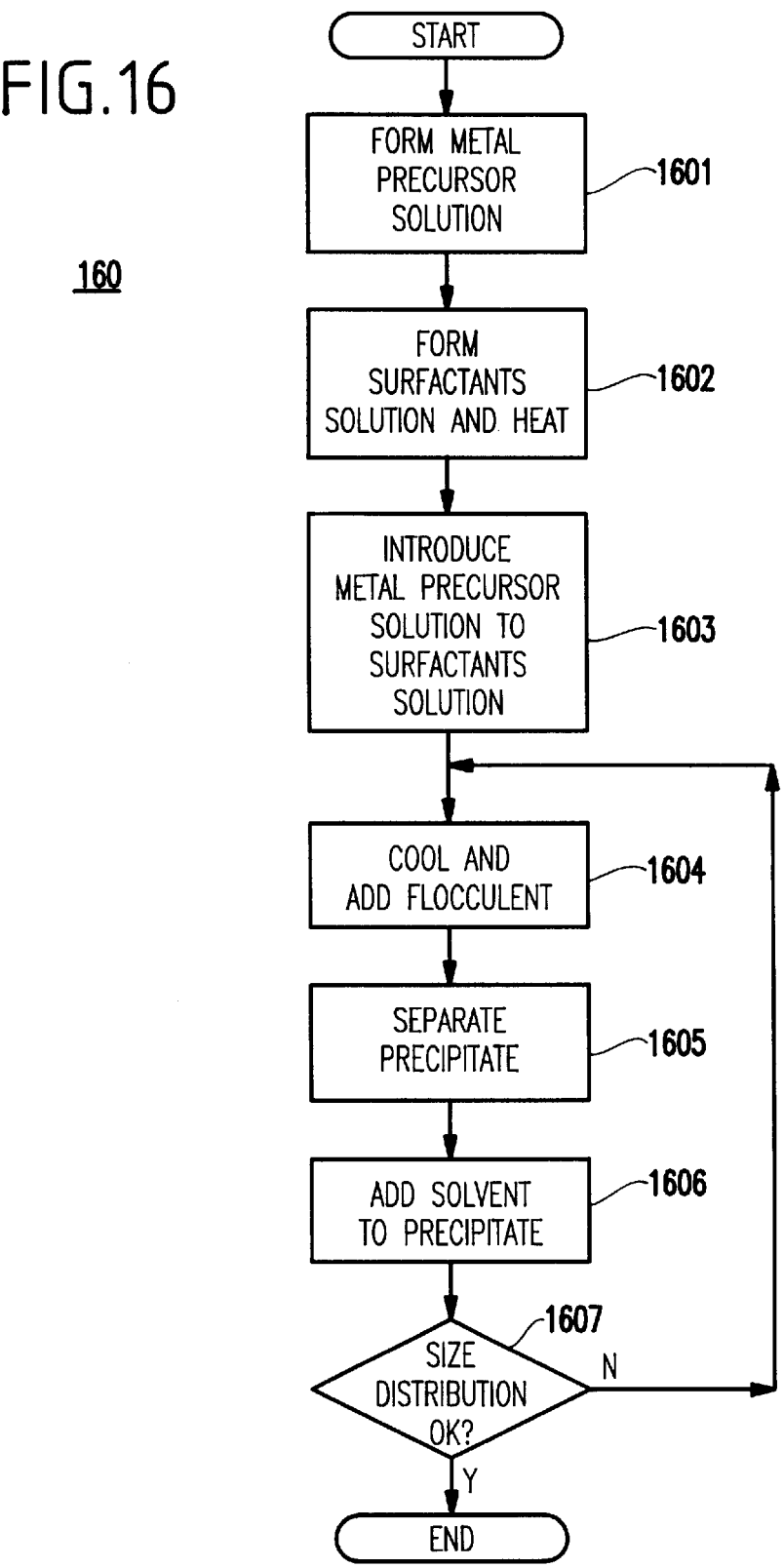

METHOD FOR PRODUCING NANOPARTICLES OF TRANSITION METALS

BACKGROUND OF THE INVENTION

1. Field of the Invention

The present invention relates to nanoparticles of transition metals, and more particularly to convenient chemical syntheses of stable, monodisperse elemental (such as hexagonal close-packed (hcp), face-centered Cubic (fcc), and a novel cubic phase of cobalt, alloy (Co/Ni, NiFe, Co/Fe/Ni,) (where relative concentrations of the elements can vary continuously) and intermetallic ($Co_3Pt$, CoPt, $CoPt_3$, $Fe_3Pt$, FePt, $FePt_3$ etc. which are distinct compounds with definite stoichiometries), and overcoated magnetic nanocrystals (e.g., particles consisting of a concentric shell of material of different chemical composition produced by a serial process) preferably having sizes substantially within a range of about 1 to about 20 nm.

2. Description of the Related Art

Magnetic properties of fine particles are different from those of bulk samples due to a "finite size" effects.

Specifically, with the finite size effect, as the particle size is reduced from micrometer to nanometer scale, the coercive forces increase and reach a maximum at the size where the particles become single-domain.

Potential applications of small magnetic particles include not only ultra-high density recording, nanoscale electronics, and permanent magnets, but also their use as novel catalysts, in biomolecule labeling agents and as drug carriers. An important goal related to each of these potential applications is to make monodisperse magnetic domains with high durability and corrosion resistance.

A variety of physical and chemical synthetic routes have been attempted to produce stable, monodisperse zero-valent magnetic nanocrystals. These include sputtering, metal evaporation, grinding, metal salt reduction, and neutral organometallic precursor decomposition.

Conventionally, controlling the particle size of nanostructured metal clusters has been limited only to late transition metals, such as Au, Ag, Pd and Pt particles. The early transition metal particles prepared according to conventional methods are either in aggregated powder form or are very air-sensitive, and tend to agglomerate irreversibly. This is problematic because the air sensitivity generates safety concerns when large quantities of the materials are present, and results in degradation over time due to oxidation unless expensive air-free handling procedures are employed during processing and the final product is hermetically sealed. The irreversible agglomeration of the particles makes separation processes which could narrow the size distribution impossible, and prevents the ready formation of smooth thin films essential in magnetic recording applications. The agglomeration reduces the chemically-active surface for catalysis, and seriously limits the soluability essential for biological tagging, separation and drug delivery applications.

Thus, precise control of particle dimensions and making monodisperse nanocrystals remain important goals in technological applications of nanomaterials. Ferromagnetic uniaxial Cobalt-based nanomaterials (e.g., many of these materials are tetragonal crystal structures which like the hcp structure is uniaxial) (e.g., such as CoPt inter-mettalics, and Co/Ta/Cr alloy) have been used in high density recording media, while fcc cobalt-based nanoparticles or Ni/Fe alloy particles are magnetically soft materials with low anisotropy which is advantageous in the development of read heads and in magnetic shielding applications. It is noted that the terms "hexagonal close-packed (hcp)" and "face-centered cubic (fcc)" refer to the specific internal crystal structure of the particles and is important determining the anisotropy of the magnetic properties. Additionally, these materials are anticipated to display interesting, giant (e.g., very large) magnetoresistive properties when organized in extended arrays, and thus are candidates, for example, for magnetoresistive read head sensors.

Moreover, previously, the reproducible chemical synthesis of magnetic transition metal nanocrystals uniform to better than about 5% in diameter has been difficult or impossible. The inability to control nanocrystal size to better than 5% has in turn frustrated any efforts to prepare 2- and 3-dimensional ordered assemblies of these uniform transition metal and metal alloy nanocrystals. Traditional methods for the preparation of metal nanocrystals include physical methods such as mechanical grinding, metal vapor condensation, laser ablation, electric spark erosion, and chemical methods included solution phase reduction of metal salts, thermal decomposition of metal carbonyl precursors, and electrochemical plating.

When any of these physical or chemical processes is performed directly in the presence of a suitable stabilizing agent and a carrier fluid or the metal particle deposited from the vapor phase into a carrier fluid containing a suitable stabilizer, a magnetic colloid (e.g., ferrofluid) may result. All of the above-mentioned techniques have been practiced for many years and have been unable to refine the level of control needed for the production of stable magnetic colloids of transition metals and metal alloys to the levels demonstrated by the present inventors.

Several factors have limited the efficacy of the existing techniques. First, the technical difficulty involved in the isolation/purification of the magnetic colloids is high, and in fact only in the last decade have the tolerances for the performance of materials and devices based on magnetic materials and devices narrowed to make uniformity in size to better than 5% a distinct advantage. Secondly, the tremendous growth in magnetic technology in medical and biotechnology industries has opened many new applications.

Thus, the conventional techniques have been unable to exercise the required control in the production of stable magnetic colloids of transition metals and metal alloys. The poor chemical stability of the conventional metal particle has limited the reliability of systems in which they are incorporated and has prompted wide-scale use of the metal oxide nanoparticles in many applications despite the weaker magnetic properties inherent in the metal oxide particles.

SUMMARY OF THE INVENTION

In view of the foregoing and other problems of the conventional methods and processes, an object of the present invention is to provide an inexpensive chemical process for preparing stable monodisperse elemental, intermetallic, alloy and over-coated nanocrystals.

Another object of the present invention is to provide nanocrystalline materials with precisely controlled size and monodispersity for magnetic recording applications such as for magnetic storage application (recording media, as well as read and write heads).

Yet another object of the present invention is to make a ferrofluid.

In a first aspect of the present invention, the present inventors have developed a novel, inexpensive and very convenient processes for the preparation of monodisperse magnetic elemental and alloy nanoparticles such that high-quality magnetic nanocrystals have been achieved.

More specifically, a method of forming nanoparticles, includes steps of: forming a metal precursor solution from a transition metal; introducing the metal precursor solution to a surfactant solution; adding a flocculent to cause nanoparticles to precipitate out of solution without permanent agglomeration; and adding a hydrocarbon solvent for one of redispersing and repeptizing the nanoparticles.

In a second aspect of the present invention, a method of forming nanoparticles, includes steps of: forming a metal salt precursor solution containing surfactant (optimally a nonionic surfactant (e.g., tertiary organophosphine) and an ionic surfactant (e.g., carboxylate) in a non-reactive solvent, injecting an agent into the solution to reduce the metal salt in situ producing colloidal metal particles; adding a flocculent to cause nanoparticles to precipitate out of solution without permanent agglomeration and separating the by-products of the synthesis which remain in solution; and adding a hydrocarbon solvent to the precipitate to either redisperse or repeptize the purified nanoparticles.

In a third aspect of the invention, a method of forming nanoparticles includes steps of: forming a metal precursor solution of transition metal complex at a first temperature; forming a surfactant solution which is heated to a temperature higher than the first temperature; injecting the metal precursor solution to the warmer surfactant solution, resulting in production of colloidal metal particles; adding a flocculent to the mixture to cause nanoparticles to precipitate out of solution without permanent agglomeration; and adding a hydrocarbon solvent to either redisperse or repeptize the nanoparticles.

Preferably, with the present invention, hexagonal close packed cobalt particles are synthesized by use of long chain (e.g., C8–C22) dihydric alcohols (e.g., diol) to reduce cobalt salts (e.g., carboxylate such as acetate) or beta-dikenonates (e.g., acetylacetonate). While preferable for the long chain dihydric alcohol to contain C8–C22 atoms, favorable results may be achieved using a long chain of C6–C22 atoms. Face-centered cobalt nanocrystals are obtained via thermal decomposition of zero valent cobalt complexes (e.g., cobalt carbonyls and cobalt organophosphine complexes), for example. Novel cubic phase cobalt nanoparticles are prepared through a superhydride reduction of cobalt salts.

Further, with the invention, preferably all types of cobalt particles are stabilized by a combination of long chain carboxylic acid (e.g., C8–C22) and optimally oleic acid and trialkylphosphine. While preferable for the long chain carboxylic acid to contain C8–C22 atoms, favorable results may be achieved using a long chain of C6–C22 atoms. This stabilization is effective such that the particles can be handled easily, either in solution phase or as solid form under air. The particles are easily redispersible in a range of common aprotic solvents (e.g., ethers, alkanes, arenes, and chlorinated hydrocarbons). Additionally, size-selective precipitation (e.g., preferably by adding non-solvent (e.g., alcohol) to the nonaprotic solvent alkane solution of the particles) isolates to monodisperse nanocrystal fractions from the original distribution. Besides cobalt-based particles, the present invention also is useful in producing Ni, Cu, Pd, Pt, and Ag nanoparticles. The invention produces binary intermetallic compounds ($Co_3Pt$, CoPt, $CoPt_3$, $Fe_3Pt$, FePt, and $FePt_3$) and binary alloys (e.g., Co/Ni, Ni/Fe, and Co/Fe) and ternary alloys (e.g., Co/Fe/Ni). The invention also produces over-coated (e.g., such as Co—Ag and Co—Pt) nanostructured particles.

Thus, with the unique and unobvious features of the present invention, an inexpensive chemical process is provided for preparing stable monodisperse elemental, intermetallic, alloy, and over-coated magnetic nanocrystals. Further, nanocrystalline materials are efficiently produced with controlled size and monodispersity for magnetic recording applications such as for magnetic recording media, read and write heads, and a ferrofluid is inexpensively produced.

Thus, the present invention provides an improved procedure for preparing monodisperse magnetic colloids (e.g., ferrofluids) comprised essentially of nanometer-sized (e.g., substantially within a range of about 1 to about 20 nm) single crystals (e.g., nanocrystals) of elemental cobalt, nickel, or iron, intermetallic (e.g., CoPt and FePt) or alloys (e.g., binary alloys such as Co/Ni, Co/Fe, and Ni/Fe, and ternary alloys such as Co/Fe/Ni or the like), a colloidal stabilizer, and an organic carrier fluid.

In the methods of preparing magnetic colloids according to the present invention, several important innovations substantially improve the uniformity in nanocrystal size, shape, and crystal structure, as well as improved resistance of the nanocrystals to chemical degradation (e.g., oxidation).

For example, some of the innovations include: 1) controlling nucleation phenomena by rapid injection (e.g., for purposes of the present application, "rapid" represents the total delivery of the reagents in less than five seconds, and more optimally between 0.5 and 2 sec) of solution containing at least one of the essential reagents for reaction into a flask containing a hot solution of all other necessary reagents which are being vigorously stirred under an inert gas atmosphere (e.g., preferably Ar, He or $N_2$); 2) adding a tertiary alkylphosphine or arylphosphine to mediate the metal particle growth; (3) changing the constitution of the reaction medium to allow controlled growth at temperatures higher than the standard procedures to improve crystalline quality of the individual nanocrystals; and 4) employing size-selective precipitation and centrifugation after the initial stages of the synthesis to narrow the particle size distribution to less than 10% (and optimally less than 5%) standard deviation in diameter.

The above-mentioned innovations may be employed individually, or in combination, to improve control of the composition and performance of the ferrofluid in addition to providing a medium from which high quality magnetic nanocrystals can be isolated.

BRIEF DESCRIPTION OF THE DRAWINGS

The foregoing and other purposes, aspects and advantages, as well as the synthetic and measurement results of the present invention, will be better understood from the following detailed description of preferred embodiments of the invention with reference to the drawings, in which:

FIG. 15 illustrates a flowchart of the steps of the inventive process; and

FIG. 16 illustrates a flowchart of the steps of another method of the inventive process.

DETAILED DESCRIPTION OF PREFERRED EMBODIMENTS OF THE INVENTION

Figure 1A:
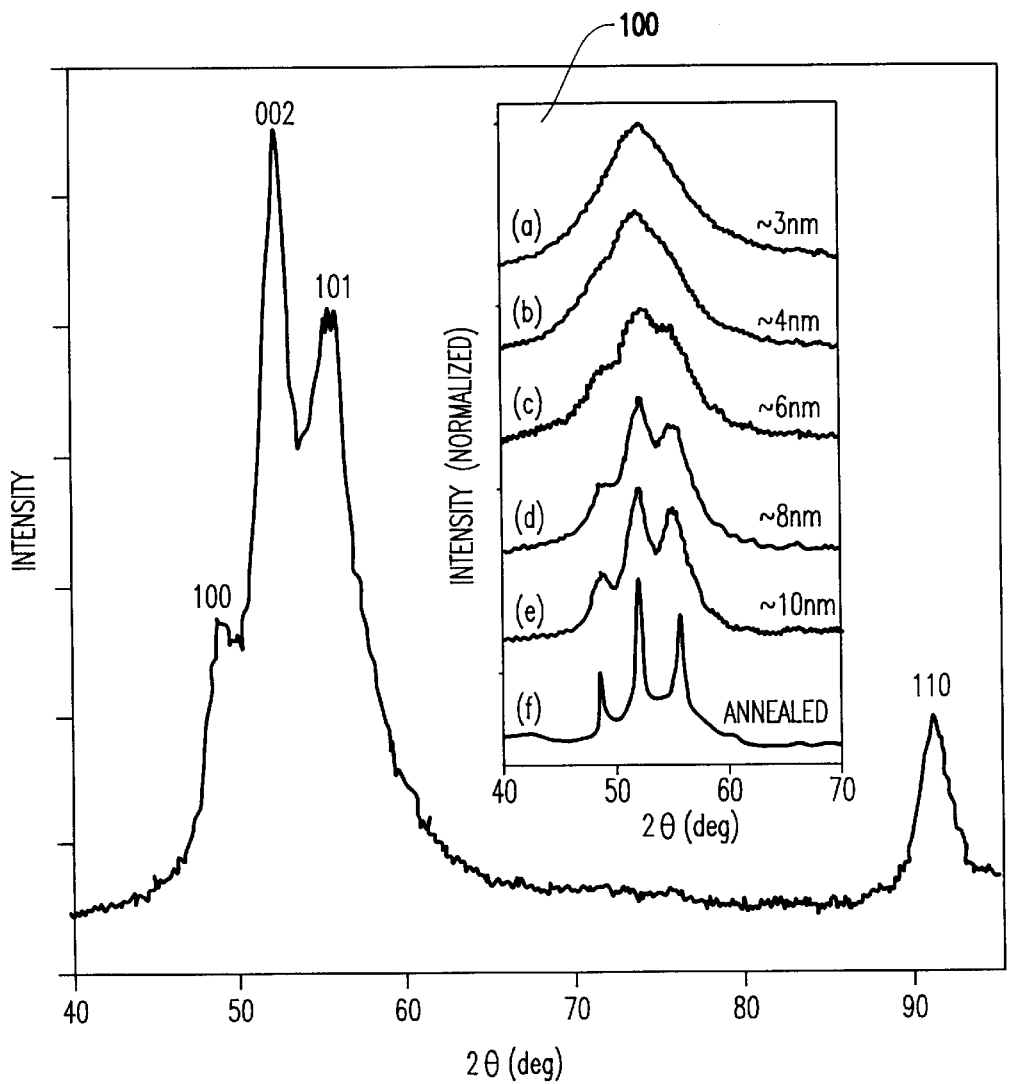
FIG. 1A is a graph illustrating an X-ray powder analysis of the particles with different size ranges from diol reduction using a sample prepared by the evaporation of hexane solution of the particles on a silicon substrate (e.g., (100) Si)

Referring now to the drawings and more particularly to FIGS. 1–16, embodiments of the invention are illustrated.

Generally, the present invention is an inexpensive and efficient process for preparing monodisperse magnetic elemental and alloy nanoparticles such that high-quality magnetic nanocrystals are formed. As described below, hexagonal close packed (hcp) cobalt particles, for example, are synthesized by long chain dihydric alcohol (e.g., diol) reduction of cobalt acetate, thereby to obtain face-centered cobalt (fcc) nanocrystals, for example, via thermal decomposition of dicobalt octacarbonyl. Novel cubic cobalt nanoparticles are prepared through a superhydride reduction of cobalt salts.

With the invention, all types of cobalt particles are stabilized by a combination of oleic acid and trialkylphosphine, which is effective such that the particles are handled easily either in solution phase or as solid form under air. The particles are easily redispersed in aprotic solvent. Additionally, size-selective precipitation (e.g., preferably by adding non-solvent alcohol to the alkane solution of the particles) leads to monodisperse nanocrystals. While not being limited thereto, the present invention also is useful in producing Ni, Cu, Pd, Pt, and Ag nanoparticles, as described below. The invention produces intermetallics (e.g., CoPt, FePt), binary alloys (e.g., Co/Ni, CoFe, and Fe/Ni) and ternary alloys (e.g., Co/Fe/Ni), and over-coated (e.g., such as Co—Ag, Co—Pt, and FeNi—Ag) particles.

Thus, an inexpensive chemical process is provided for preparing prepare stable monodisperse elemental, intermetallic, over-coated and alloy magnetic nanocrystals. Further, nanocrystalline materials are efficiently produced with controlled size and monodispersity for magnetic recording applications such as for disk and head media, and a ferrofluid is inexpensively produced.

Turning to a first embodiment, trialkylphosphine is chosen as one stabilizing ligand because it is a well-known ligand to stabilize zero valent metal due to a σ-donating and π-back bonding characteristics.

In the present invention, a plurality of different phosphines can be used such as symmetric tertiary phosphines (e.g., tributyl, trioctyl, triphenyl, etc.) or asymmetric phosphines (e.g., dimethyl octyl phosphine). These phosphines may be employed singly or if the situation warrants can they be used together. However, the inventors have found that trialkylphosphines reduce the particle's growth rate, but do not prevent the particle from growing to undispersable aggregates (e.g., greater than 20 nm. at temperatures between 100° C. and 350° C.).

In general according to the invention, the surfactant comprises an "organic stabilizer" which is a long chain organic compound that may be expressed in the form R—X where:

(1) R -a "tail group", which is either a straight or branched hydrocarbon or flourocarbon chain. R-typically contains 6–22, but preferably 8–22 carbon atoms (2) X -a "head group", which is a moiety (X) which provides specific chemical attachment to the nanoparticle surface. Active groups could be sulfinate (—$SO_2OH$), sulfonate (—SOOH), phosphinate (—POOH), phosphorate —OPO$(OH)_2$, carboxylate, and thiol.

| Thus the stabilizers which result are: | sulfonic acids | R—SO$_2$OH |
| --- | --- | --- |
| | sulfunic acids | R—SOOH |
| | phosphonic acids | R$_2$POOH |
| | phosphoric acids | R—OPO(OH)$_2$ |
| | carboxylic acids | R—COOH |
| | thiols | R—SH |

One specific preferred choice of organic stabilizer material is oleic acid.

Oleic acid is a well-known surfactant in stabilizing colloids and has been used to protect iron nanoparticles. A relatively long (e.g. oleic acid has an 18 carbon chain which is ~20 angstroms long; oleic acid is not aliphatic and it has one double bond) chain of oleic acid presents a significant steric barrier to counteract the strong magnetic interaction between the particles. Similar long chain carboxylic acids, such as erucic acid and linoleic acid, also have been used in addition (e.g., any long chain organic acid with between 6 and 22 carbon atoms may be employed singly or in combination) to oleic acid. Oleic acid is typically preferable because it is easily available inexpensive natural sources (e.g., olive oil). However, carboxylic acid alone cannot protect the growing Co particles for optimum growth.

The combination of the aforementioned phosphines and organic stabilizers (e.g. triorganophosphine/acid) offers good control on particle growth and stabilization. Phenylether or n-octylether are preferably used as the solvent due to their low cost and high boiling point although di-decyl and di-dodecylether can be employed. The reaction can be performed at temperatures ranging from 100° C. to 360° C. depending on the nanoparticles needed and boiling point of the solvent, and more preferably at ~240° C. If the temperature is lower than this temperature range, the particles do not grow. If the temperature is above this range, the particles grow uncontrolled with increased production of undesirable by-products.

A polyol process, a commonly known process in the art, involves the reduction of metal salts by diols. The common procedure involves dissolving the metal precursors in the neat diol and heating to initiate reduction of metal salts and produce particles. There is no temporally discrete nucleation step and little or no size control. Thus, the polyol process has been used to reduce metal salts including cobalt acetate to metal particles. Ethylene glycol is the most often used as the reducing agent. The reduction takes hours (e.g., typically hours) to occur and stabilization of the particles is difficult except for the late transition metal, such as Ag, Pt and Pd particles which are relatively chemically inert. In the conventional polyol reduction of cobalt, the final product contains both hcp and fcc phases of cobalt.

Compared with ethylene glycol, long chain diols such as 1,2-octanediol, 1,2-dodecanediol and 1,2-hexadecanediol have higher boiling points (e.g., 200–300° C. as compared to the boiling point for ethylene glycol of 200° C.) and, if used at reflux, the long chain diols can easily and quickly reduce metal salts. Thus, reduction of cobalt acetate by these diols at 200–240° C. finishes within 20 minutes. The most significant improvement provided by using the long chain diols is that these molecules, when dissolved in the high boiling solvent, allow the particles to remain dispersed during synthesis. In the conventional method, employing neat diols such as ethylene glycol or propylene glycol fails in large part because the particles as they are produced are insoluble in the diol and aggregate immediately. The method and process according to the present invention avoids this by using an inert solvent and a long chain diol. Thermal decomposition of dicobalt octacarbonyl is another known synthesis procedure used for fcc cobalt.

A variety of polymers and surfactants have been used conventionally, to control particle growth. However, oxidation of the particles readily occurs, and cobalt oxide particles are usually obtained. Super-hydride (LiBHEt$_3$) has been used to reduce metal halide in tetrahydrofuran in the presence of alkylammonium bromide (R$_4$NBr) at room temperature to give small particles (<about 4 nm).

With the present invention, reduction at approximately 100° C.–240° C. in high boiling ether (e.g., octylether or phenylether) has been used, and leads to a well-defined X-ray powder pattern to reveal a new crystal phase of cobalt. With the invention, stabilization of all three kinds of cobalt nanoparticles is obtained by the combination of oleic acid and trialkylphosphine. The same principle also applies to other metal systems, such as Ni, Cu, Pd, and Ag. Co- and Ni-based alloy nanoparticles are particles which are relatively chemically inert. The final product also can be easily prepared similarly, as would be known to one ordinarily skilled in the art in light of the present specification.

Turning now to an exemplary process according to the invention, the synthesis began with an injection of a reducing agent or an ether solution of dicobalt octacarbonyl in the presence of long chain carboxylic acid (e.g. C6–C22) and trialkylphosphine. The introduction of the reagents by injecting preferably should be a single injection lasting less than 5 seconds for the delivery of the entire contents.

The reduction or decomposition occurred in a short time (e.g., about 10 minutes), leading to a temporally discrete homogeneous nucleation. The growth of the particles was finished in less than 30 minutes such that cobalt or other metals and their alloy particles could be handled without inert atmosphere protection. As compared to the conventional methods described above which took several hours, the method of the present invention in growing the nanoparticles is very efficient (e.g., on the order of much less than the conventional methods).

According to the present invention, size-selective precipitation was performed by titrating the hexane solution of the particles with non-solvent ethyl alcohol and providing substantially monodisperse cobalt nanocrystals which could be easily redispersed in alkane solvent.

The crystal phase of the final product was determined by X-ray powder diffraction, and selected area electron diffraction. There are only two stable phases known for elemental cobalt at ambient pressures. The hcp form is stable at temperatures below 425° C., while the fcc form is the stable structure at higher temperatures.

Figure 1B:
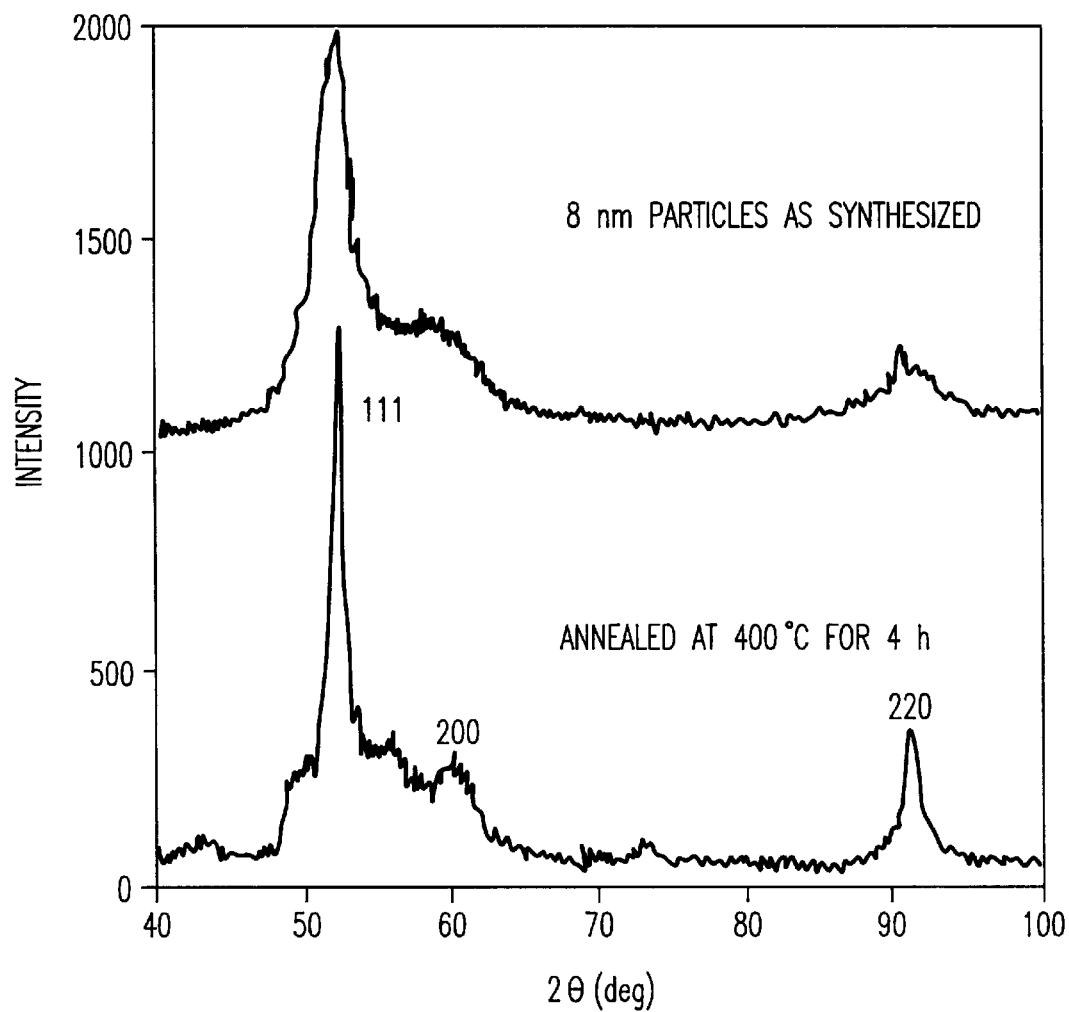
FIG. 1B is a graph illustrating X-ray powder analysis of 8 nm diameter, fcc cobalt nanoparticles from cobalt carboxyl decompositions.
Figure 2:
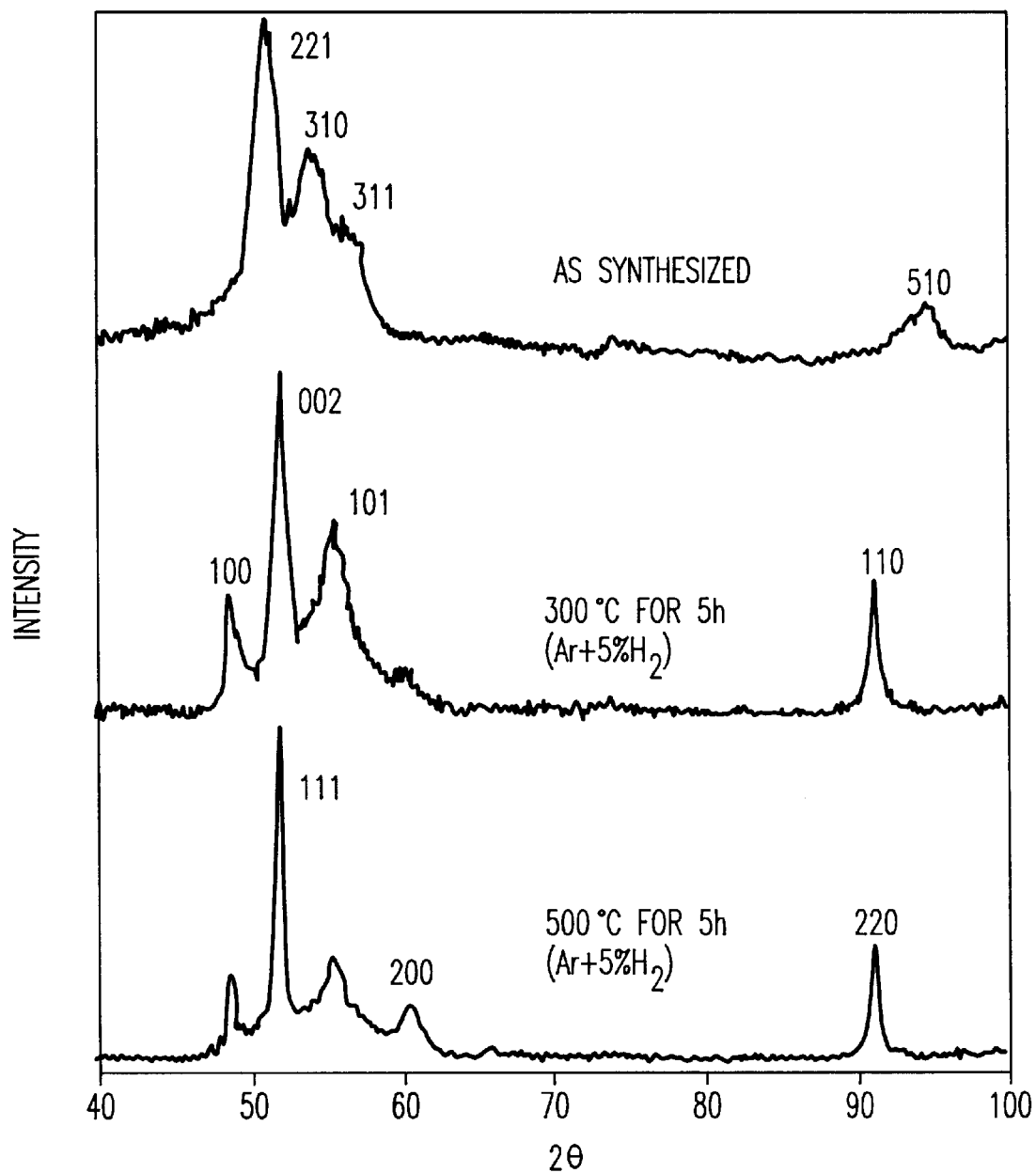
FIG. 2 is a graph illustrating an X-ray powder pattern of particles from a superhydride reduction and shows a pattern similar to the X-ray diffraction of β-phase of manganese (Mn) cubic phased manganese (e.g., as shown by the lower two diffraction patterns, the heating of the β-Mn phase causes it to transform to the known bulk phases; heating at below 400° C. resulting in predominantly hcp while the heating above 400° C. produces predominantly fcc)

FIG. 1A illustrates an X-ray pattern of hcp cobalt nanocrystals produced with the above method according to the invention. The peaks that appear at 2θ=49, 52, 55 and 91 degrees correspond to $d_{100}$=2.17 Å, $d_{002}$=2.02 Å, $d_{101}$=1.91 Å, and $d_{110}$=1.25 Å, respectively, and are matched with those of the hexagonal close-packed (hcp) cobalt crystal phase. The broadening of the reflection line widths as the sample size decreases in referred to as a "finite size broadening." A detailed analysis of the line widths is commonly applied to determination of the nanocrystal size. FIG. 1B shows the X-ray diffraction pattern of a fcc cobalt nanocrystal sample confirming the bulk fcc lattice spacings. The X-ray pattern of the particles from superhydride reduction do not match either hcp or fcc cobalt phase, as shown in FIG. 2, but display the same symmetry as the uncommon β phase of Mn metal. The pattern fits well to symmetry of the β-Mn structure scaled for the difference in the size of the Mn and Cobalt atoms. However, this structure is not stable at temperatures above 300° C. This thermal instability can be exploited to provide a simple route to convert the nanocrystals' internal structure to either the fcc or hcp forms, thus changing the magnetic anisotropy. Heating this novel cubic phase can be changed to hcp cobalt phase at 300° C. and fcc cobalt at 500° C. No distinct peaks corresponding to CoO and CoP phase are detected from X-ray analysis, and elemental analysis shows phosphorus incorporation is below 3%.

Depending on the ratio of stabilizing ligands, different particle sizes can be prepared with smaller particles favored by a high ratio of the stabilizer/surfactant to the metal precursor solution. For example, reduction of two equivalent (e.g., molar ratio) of the cobalt source in the presence of one equivalent of trialkylphosphine and one equivalent of oleic acid (e.g., a 1:1 ratio of trialkylphosphine to oleic acid) leads to particles up to approximately 13 nm, whereas in the presence of more equivalent of oleic acid and trialkylphosphine (e.g., a greater than 2:1:1 ratio of the metal source to the trialkylphosphine and oleic acid), smaller particles are obtained. There is no specific lower limit of the particle size but the smallest cobalt containing species have too few atoms to a have a well-formed internal lattice and more closely resemble molecular species.

The inset 100 of FIG. 1 illustrates a series of X-ray patterns of hcp cobalt particles thus prepared. Annealing the particles at 300° C. in vacuum results in the loss of stabilizing ligands yielding an insoluble mass of larger nanocrystal whose diffraction pattern is displayed in waveform f of inset 100. The particles diffuse and grow at this annealing condition as shown in the X-ray diffraction patterns (e.g., see inset 100 of FIG. 1), and become very air-sensitive. If the sample is exposed to air, cobalt oxide particles are obtained instantly.

To determine the particle size and size distribution, a drop of octane or dodecane solution containing ~500 ppm of the product is dropped onto a carbon-coated copper grid. Specifically, the drop of the colloid is placed onto a carbon-coated copper TEM grid. The solution is allowed to slowly evaporate at ambient temperature and pressure. The grid is finally dried in a vacuum chamber at room-temperature under vacuum.

Figure 3:
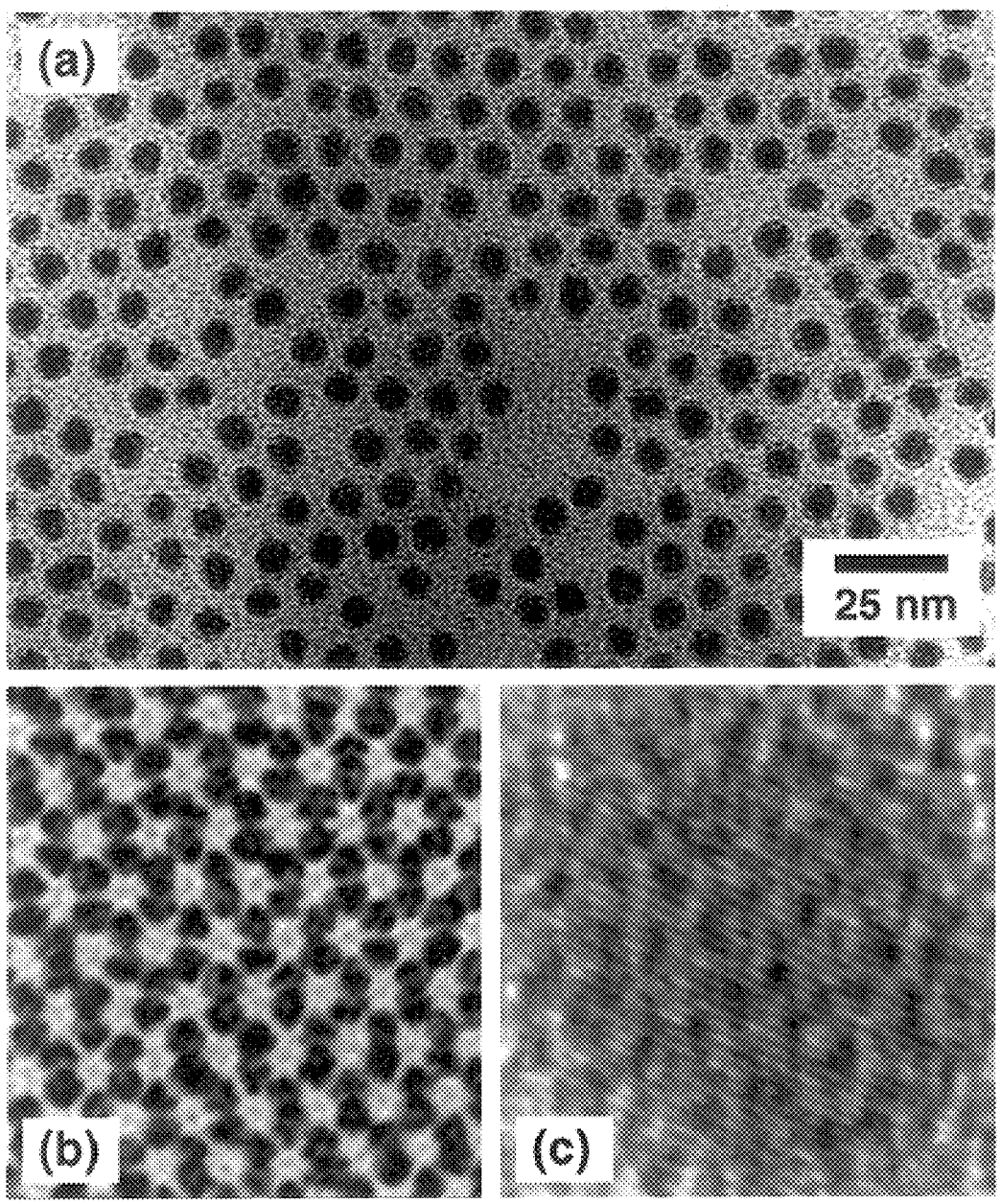
FIG. 3 is a transmission electron micrograph (TEM) image of 6 nm hcp cobalt nanocrystals prepared from diol reduction which were prepared by the evaporation of octane solution of the particles and dried under vacuum at room temperature.
Figure 4:
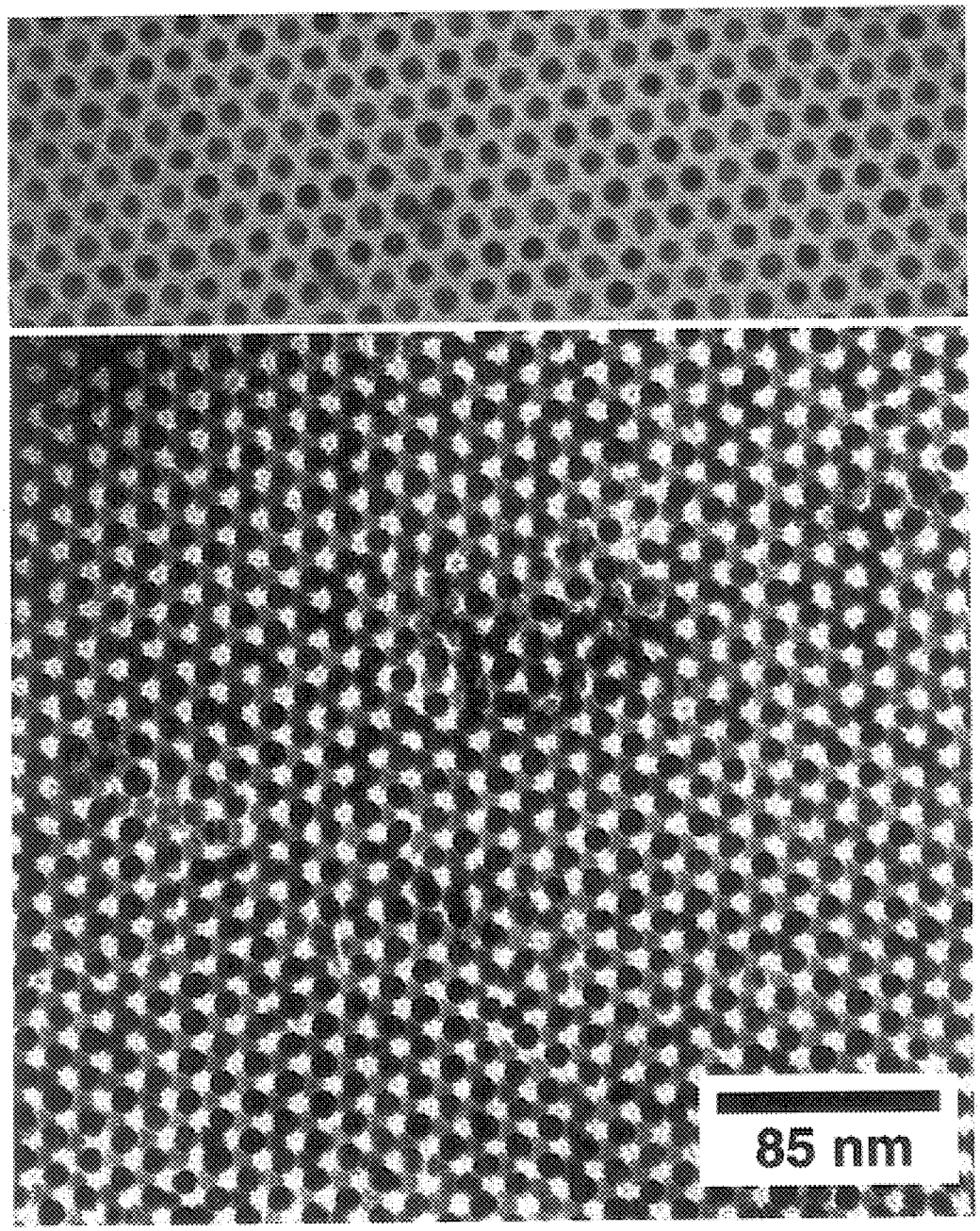
FIG. 4 is a TEM image of monodisperse β-Mn type cobalt particles from superhydride reduction.

The TEM (transmission electron ricrograph) image of about 6 nm hcp cobalt nanocrystals is shown in FIG. 3. A TEM image of about 8.5 nm, β-Mn-type cobalt particles is shown in FIG. 4.

The nanocrystals in each case are very uniform in size and the particles are separated from each other by a layer of oleic acid coordinated on the surface. Decomposition of cobalt carbonyl gives high quality fcc cobalt nanocrystals.

Figure 5:
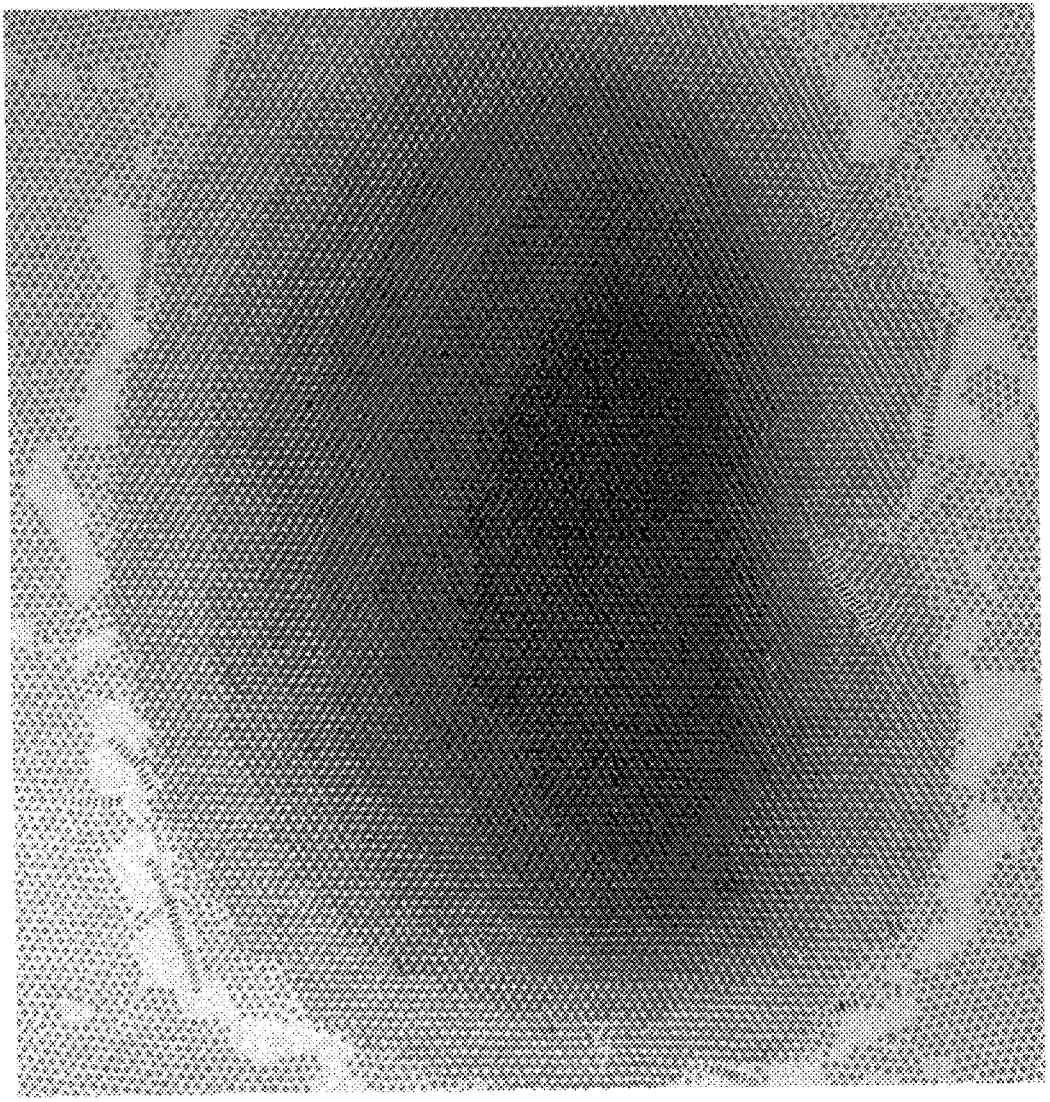
FIG. 5 is an image of 8 nm monodisperse fcc cobalt nanocrystals from decomposition of dicobalt octacarbonyl and reveals a terrace-structure due to the attractive forces between the particles (e.g., these attractive forces are a sum of the magnetic dipolar interaction and van der Waals forces) with the sample being prepared at room temperature from dodecane solution.

As shown in FIG. 5, a terrace-like multilayer is shown of 8 nm monodisperse fcc cobalt nanocrystals on an amorphous carbon film at room temperature. This three-dimensional ordering is only possible with monodisperse particle systems of extremely uniform size and shape. The particles have a tendency to self-assemble into multilayer terrace superlattice structure due to attractive magnetic and van der Waals interactions among the particles.

Figure 6:
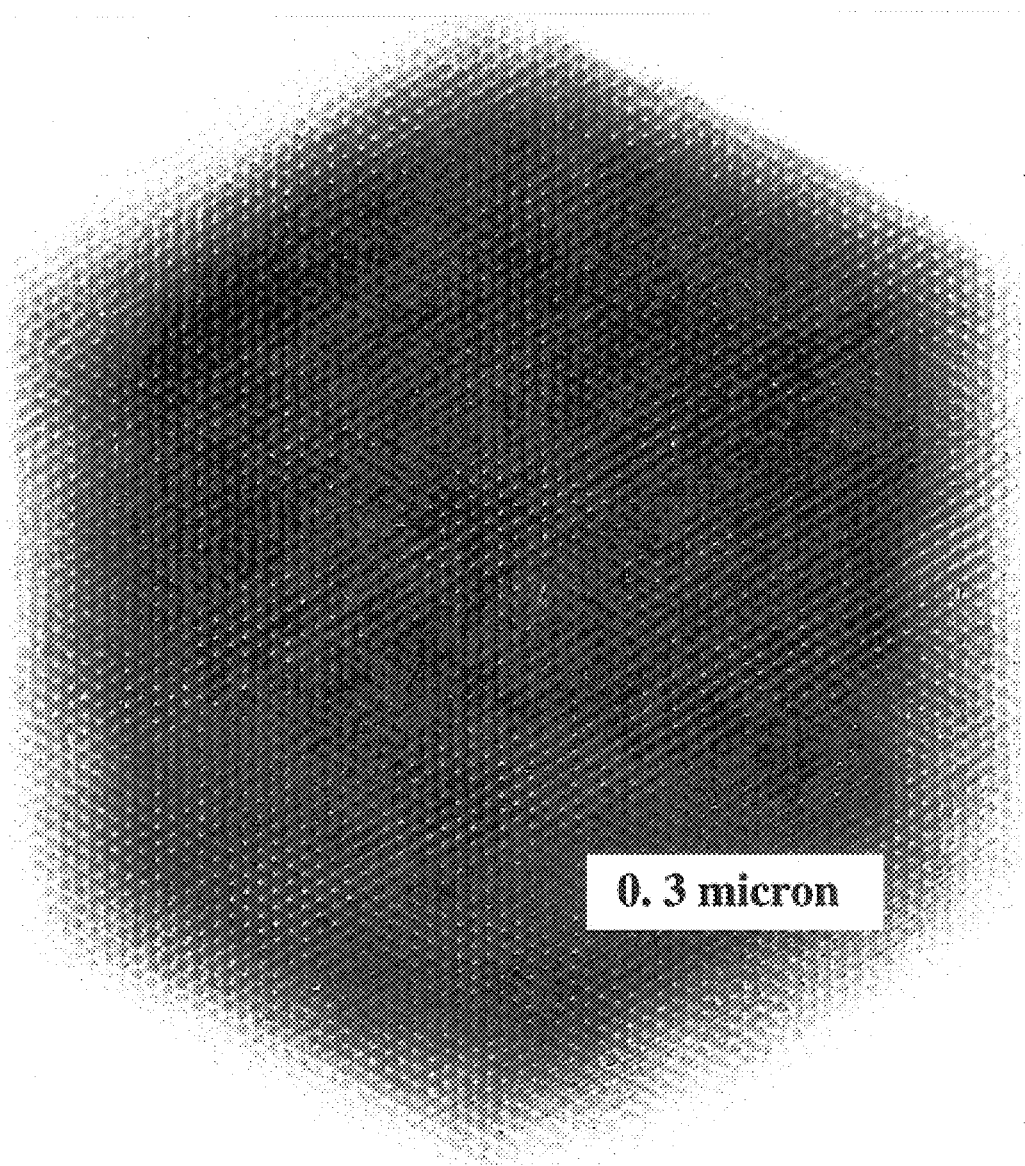
FIG. 6 is a TEM image showing the superlattice which forms due to the magnetic and van der Waals interaction of fcc cobalt particles, indicating that the particles tend to form hexagonal close-packed arrays using a sample deposited at 60° C. from dodecane solution.
Figure 7:
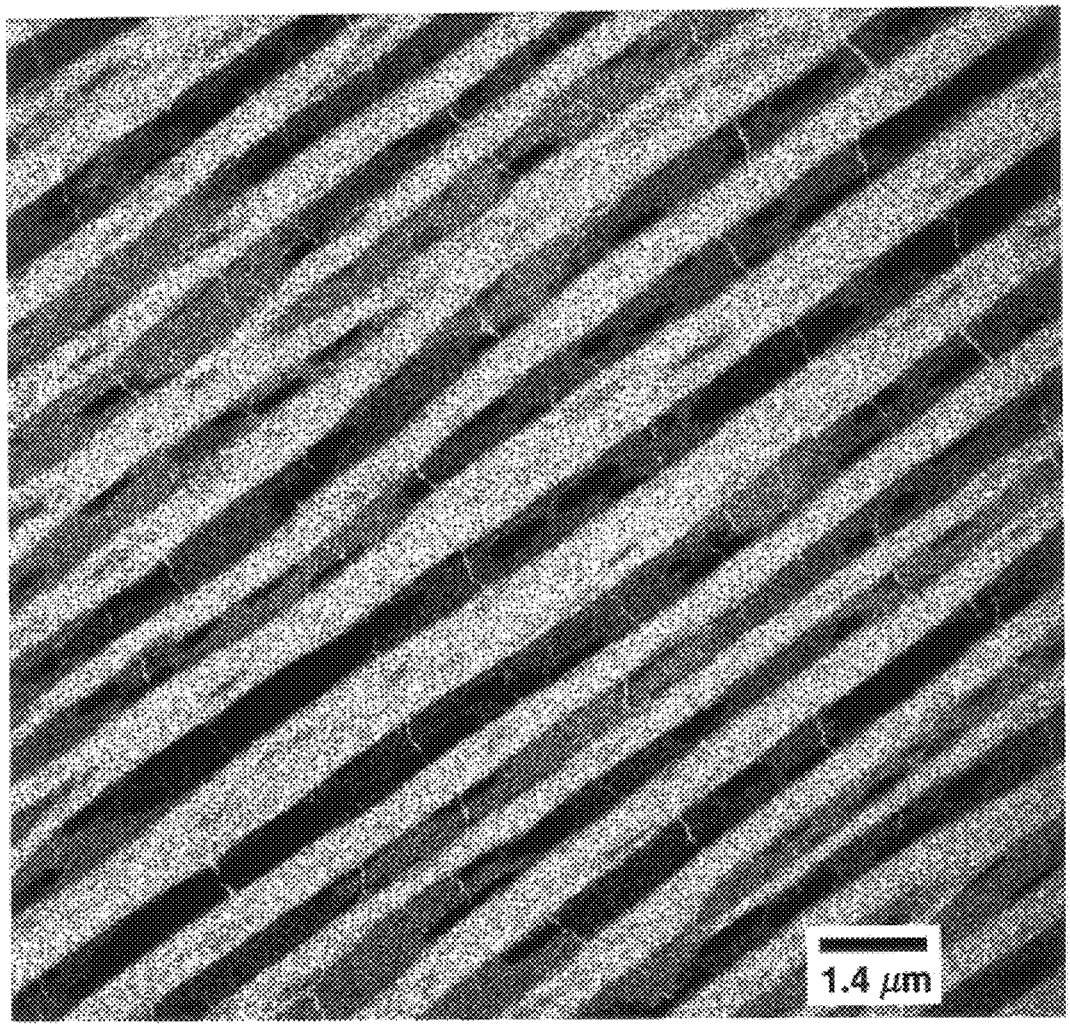
FIG. 7 is a TEM image showing the response of the particles with a small magnetic field applied parallel to the substrate during evaporation of dodecane at 60° C. where a stripe-like superlattice magnetic field pattern is formed.

If a grid is prepared at 60° C., the added thermal energy allows the particles to diffuse to lowest energy lattice sites during evaporation and to produce a well-defined faceted superlattice. A hexagon pattern of this superlattice is shown in FIG. 6, and is indicative of an inherent hexagonal packing of the individual nanocrystals in the structure. If the sample for TEM study is deposited from solution while a magnetic field is applied in the plane of the grid, the cobalt particles tend to organize along the direction of the field, resulting in stripe-like superlattices of cobalt particles, as shown in FIG. 7.

Self-assembly of nanostructured metal particles on solid surfaces in ordered structures constitutes a formidable preparative challenge which has been taken up by the present invention. This challenge is driven by the prospect of fabricating structurally uniform materials having unique electronic and/or magnetic properties suitable for a variety of different applications including recording and reproducing media as well as read and write sensors (e.g., disk, head, etc. media).

Cobalt particles prepared in accordance with the present invention have shown a high degree of ordering. The nanocrystals tend to self-organize into a hexagonal close packing (hcp) structure. The TEM images of the particles shows that the distance between the centers of the cobalt cores amount to approximately 3.5 nm. The chain length of oleic acid is approximately 2.5 nm. Thus, an approximately 3.5 nm separation represents that the protective mantels on the particle surface entangle each other. Oleic acid around the particles can be replaced by a variety of other acids such as 1,2-hexadienoic acid and polybutadiene dicarboxylic acid.

It would be obvious to one ordinarily skilled in the art given this disclosure and within its purview that nanoengineering spacing of magnetic quantum dots on a solid surface should be possible simply by varying the length of the alkyl groups of the carboxylic acid.

Figure 8:
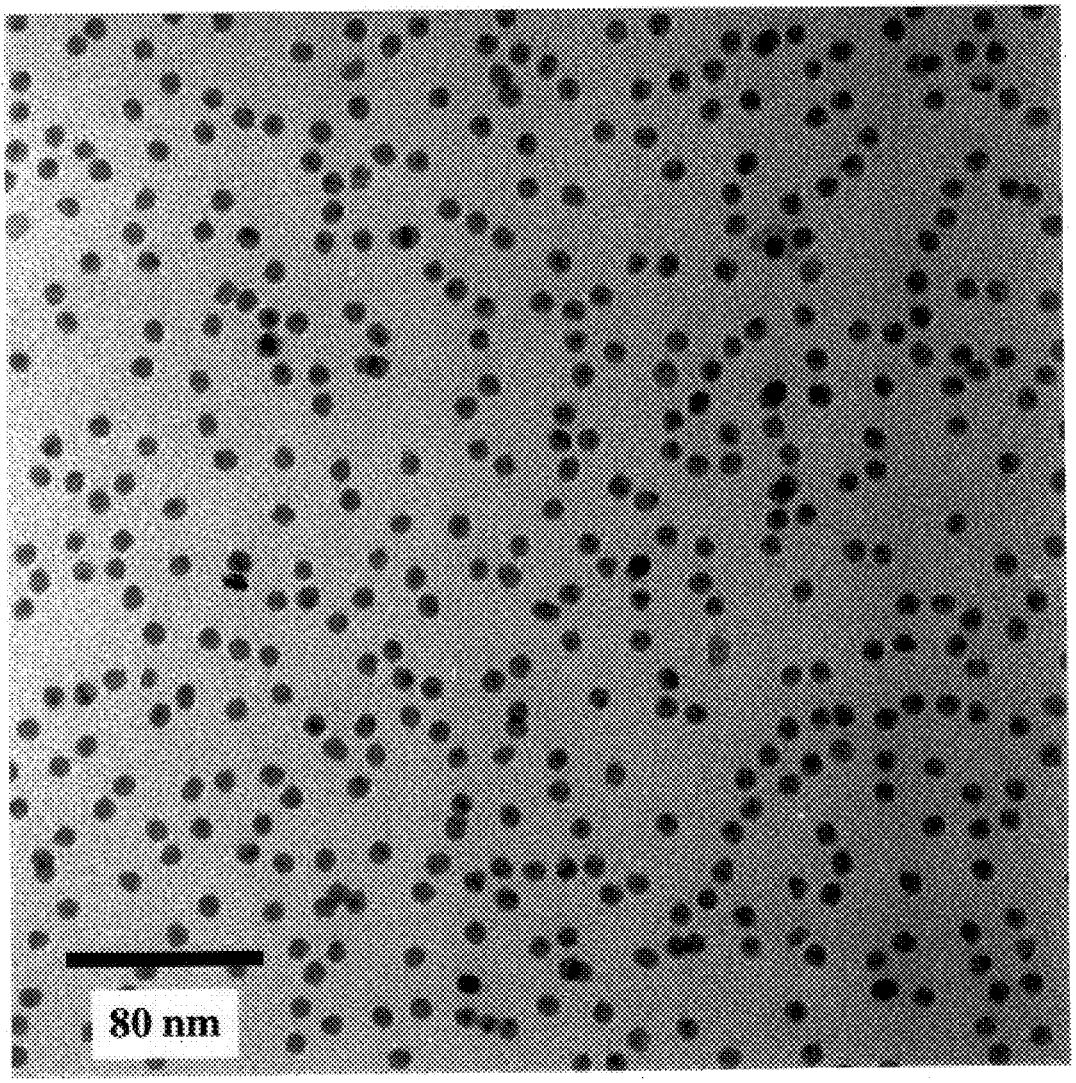
FIG. 8 is a TEM image of polyvinylpyrrolidone (PVP)-protected fcc cobalt particles prepared by evaporation of butanol solution at room temperature.

In pursuing other possible applications such as using the particles in a biological system, polyvinylpyrrolidone (PVP) can be chosen as another kind of stabilizing ligand because it contains an acetylamide group that is a basic unit in DNA, polypeptide or other biomolecules. Results have shown that PVP can readily replace oleic acid to form PVP-protected particles. The superlattice formed with the oleic acid as a ligand now disappears. The particles were well-dispersed in a typical polymer linkage pattern, as shown in FIG. 8, indicating that particles prepared in accordance with the present invention have great potential in biological labeling and imaging. Additionally, the ready solubility of the particles is desirable for magnetic separation of biological products.

Magnetic studies were performed using an MPMS2 Quantum Design super conducting quantum interference device (SQUID) magnetometer. First, the sample was dissolved either with pentane or hexane (e.g., using oleic acid as a stabilizing ligand) or with dichloromethane (e.g., using PVP as a stabilizing ligand) and loaded into a high-quality quartz tube.

Figure 9:
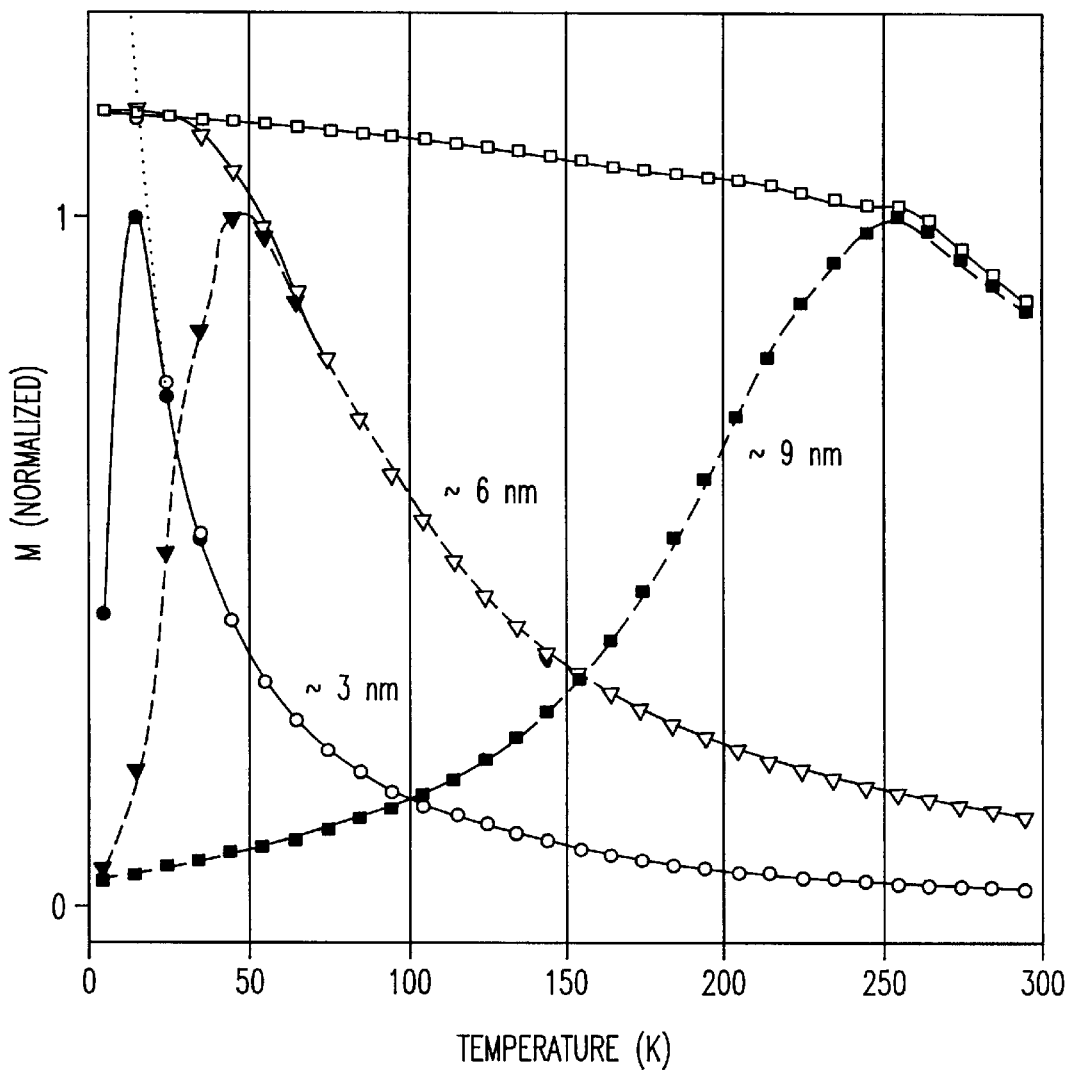
FIG. 9 is a graph illustrating the size-dependent Zero Field Cooling (ZFC)-Field Cooling (FC) magnetization versus temperature of hcp cobalt particles.
Figure 10:
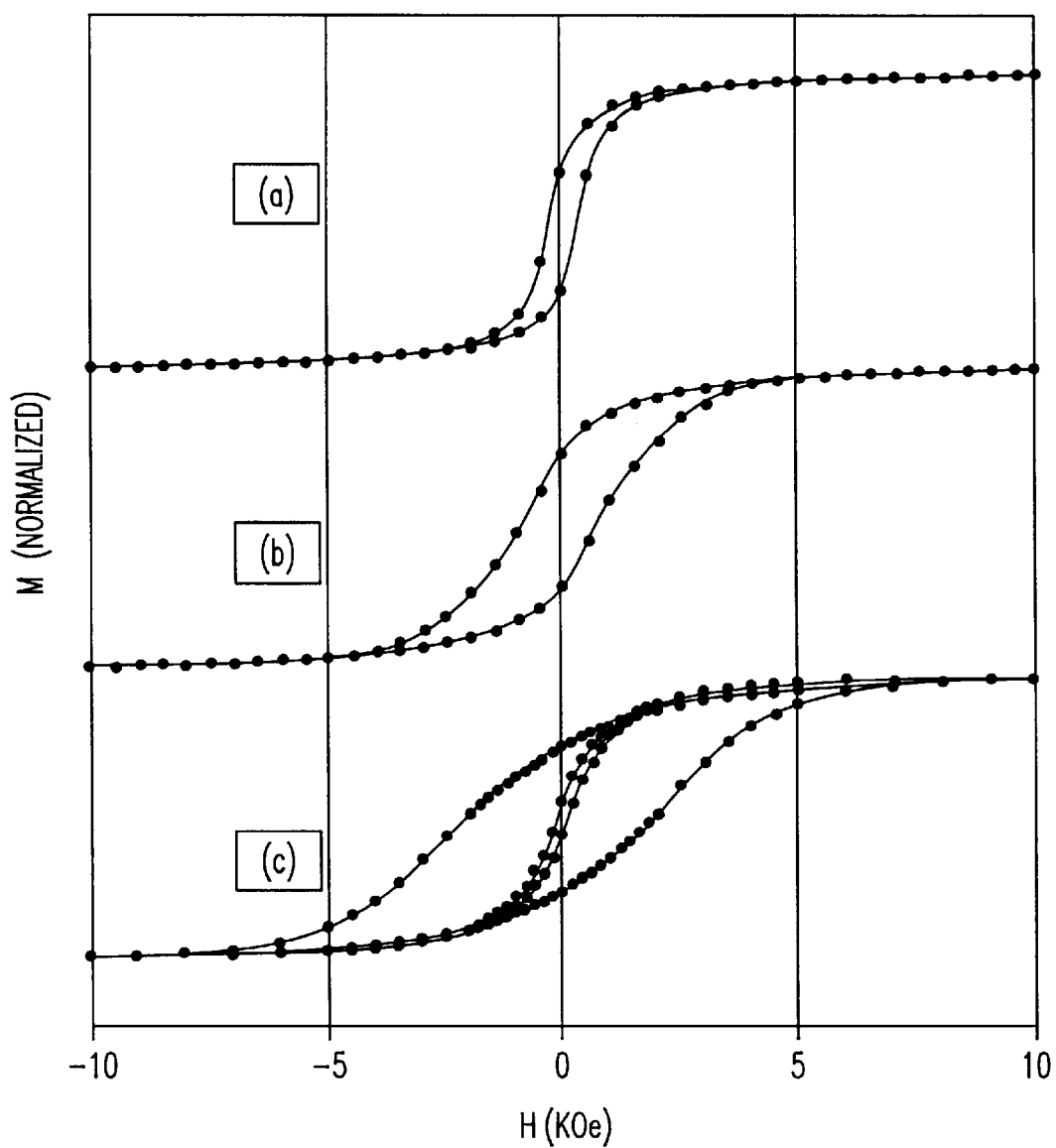
FIG. 10 is a graph illustrating size- and temperature-dependent hysteresis loops of hcp cobalt nanocrystals at 5° K.

The solvent was evaporated, and the product was dried under vacuum at room temperature. The temperature dependence of magnetization was measured in a 10 Oe field between 5 and 300° K according to the zero-field-cooling (ZFC)/field-cooling (FC) processes. Since the critical sizes for cobalt is of the order of tens of nanometers, the particles prepared here were a group of magnetic single domains. In this ultra-fine regime, thermal fluctuations will overcome magnetocrystalline anisotropy, making the particles magnetization fluctuate along the magnetic easy axis as superparamagnetism occurs. This is typically shown in the temperature dependent magnetization of the particles, as shown in the graph of FIG. 9. Specifically, FIG. 9 shows magnetization versus temperature of different size cobalt particles.

As shown in FIG. 9, the particles with size ranging from about 3 nm to about 10 nm are super-paramagnetic at room temperature. However, the super-paramagnetic properties are blocked at low temperature. For particles having a size about 9 nm, the blocking temperature occurs at $T_B$=approximately 255° K while for about 6 nm and about 3 nm particles, their $T_B$ locate at approximately 47° K and approximately 15° K, respectively (e.g., see FIG. 9), indicating the size dependent blocking behavior.

The ferromagnetic properties of the particles can be examined via their hysteresis behavior. The M-H (e.g., magnetization vs. magnetic field strength) hysteresis loop is recorded at 5° K under a field up to 1.0 T. Size-and temperature-dependent hysteresis curves are presented in FIG. 10.

For approximately 11 nm particles, the coercivity reaches 2000 Oe, whereas as the particle size decreases from approximately 9 nm to approximately 6 nm and further to approximately 3 nm, their coercivities are reduced from approximately 897 Oe to approximately 291 Oe and down to approximately 219 Oe, respectively. At room temperature, the hysteresis of particles with sizes less than approximately 9 nm disappears, while particles having a size of approximately 11 nm still show ferromagnetic behavior with an Hc of approximately 135 Oe (e.g., see FIG. 9). These values correspond well with earlier experimental results, indicating that above the superparamagnetic limit (e.g., around approximately 11 nm for cobalt), the coercive force of the particles drops sharply with the decreasing particle volume.

It has been predicted that for future ultra-high-density recording media, uniform particles with an average diameter of approximately 8–10 nm or less and a high Hc of 2500 Oe will be required. Although elemental cobalt particles are hardly used as such a media at room temperature due to the super-paramagnetic limit, the inventive synthetic approach shows ferromagnetic materials that can be applied to high density recording applications (head, disk, etc. media).

Specifically, the present inventors have been successful in extending the inventive synthetic method to other metal systems.

For example, monodisperse fcc Ni nanocrystals, and more importantly, monodisperse, Co—Pt intermetallic particles and alloy nanoparticles such as Co—Ni and Ni—Fe particles (e.g., up to approximately 20 nm in size), have been made by the reduction of relative metal acetate, or metal acetylacetonate. Ni—Fe particle materials are used in giant magnetoresistive heads. Co—Pt alloy particles are known as particle for "ultra-high density recording media". Making more uniform and well-isolated Co—Pt alloy particles is an important object of the present invention, and the inventive method contributes to making monodisperse Co—Pt nanocrystals.

Thus, as described above, the present invention achieves solution phase, high temperature reduction of metal salts and decomposition of neutral organometallic precursors which lead to metal nanoparticles. Stabilization of the particles is reached by combination, for example, of oleic acid and trialkylphosphine. Monodisperse nanocrystals can be separated by size selective precipitation. The individual particles are well-isolated from each other by an organic layer. Thus, intergranular exchange among these particles is greatly reduced.

Figure 11A:
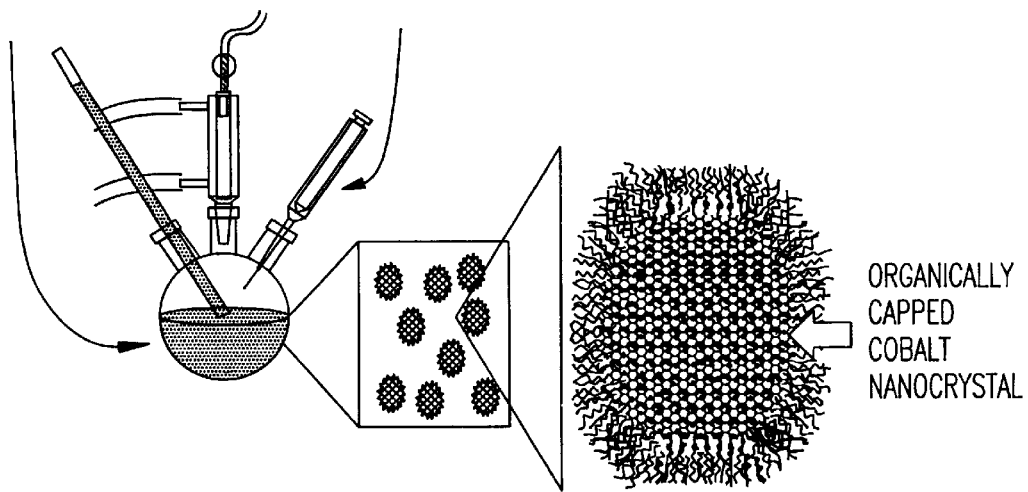
FIG. 11A illustrates a general chemical synthesis of monodisperse nanocrystals.

FIG. 11A highlights the inventive phase synthesis technique employing an injecting of reagents to control the nucleation of nanoparticles.

Figure 11B:
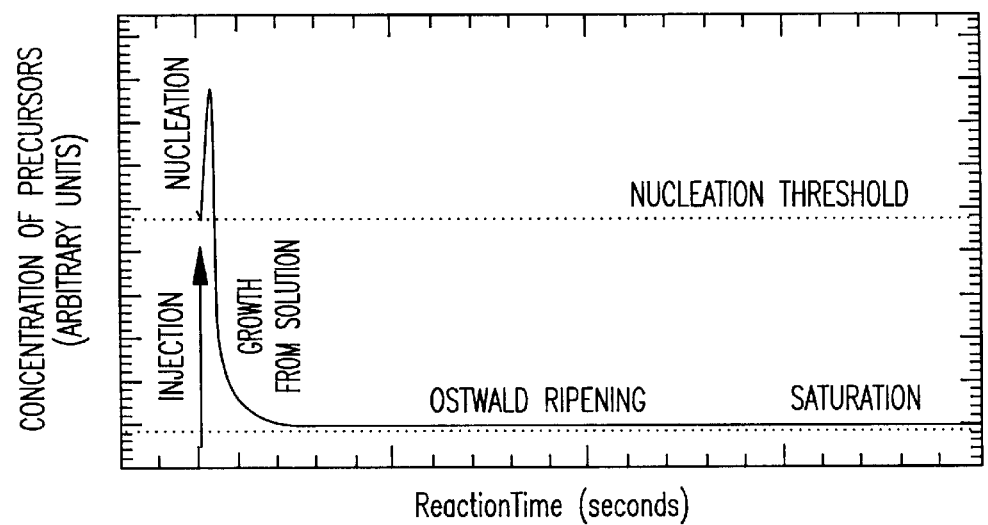
FIG. 11B illustrates a graph of the concentration of precursors versus reaction time.

FIG. 11B is a standard representation of the conditions necessary to produce monodisperse colloids to describe the growth of monodisperse micron sized sulphur colloids. Its critical feature is the temporally discrete nucleation event followed by slow growth on the nuclei. By designing a series of specific chemical procedures which conform to this general reaction outline, the present inventors have optimized the conditions for the growth of monodisperse magnetic nanocrystals.

Figure 12:
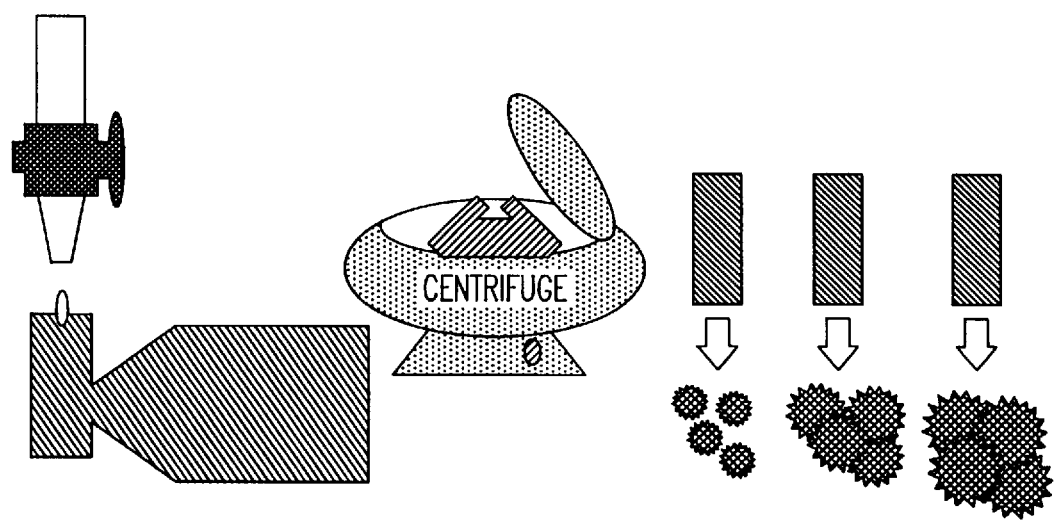
FIG. 12 is a schematic diagram of an apparatus for performing the synthesis, according to the present invention and schematically depicts a blow-up of the constituent nanoparticles (with the nanoparticle schematic showing the critical structure of a dense inorganic core and a layer of organic passivants on the surface)

FIG. 12 depicts the basic steps in size selective precipitation as described below in the Examples.

Figure 13:
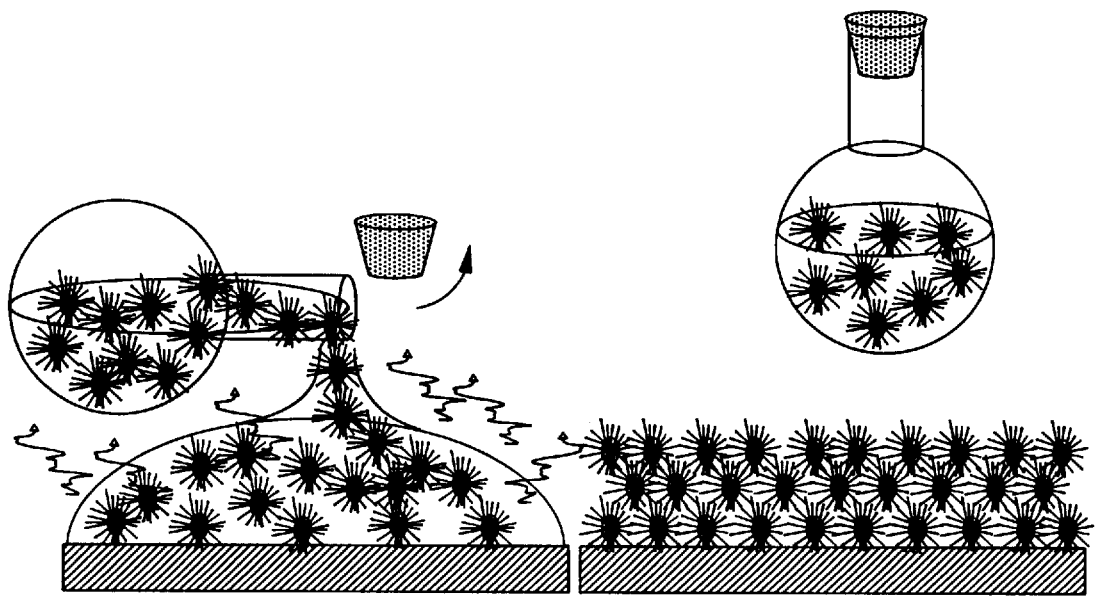
FIG. 13 is a schematic diagram of another apparatus for performing the process according to the present invention, and more specifically the size selective precipitation of the particles (e.g., the slow dropwise) addition of the flocculent to the colloidal dispersion causes the dispersion to begin to flocculate and precipitate, the precipitate being separated by centrifugation)

FIG. 13 schematically show the formation of ordered arrays of nanoparticles by the evaporation of a colloidal dispersion onto a solid substrate.

Figure 14:
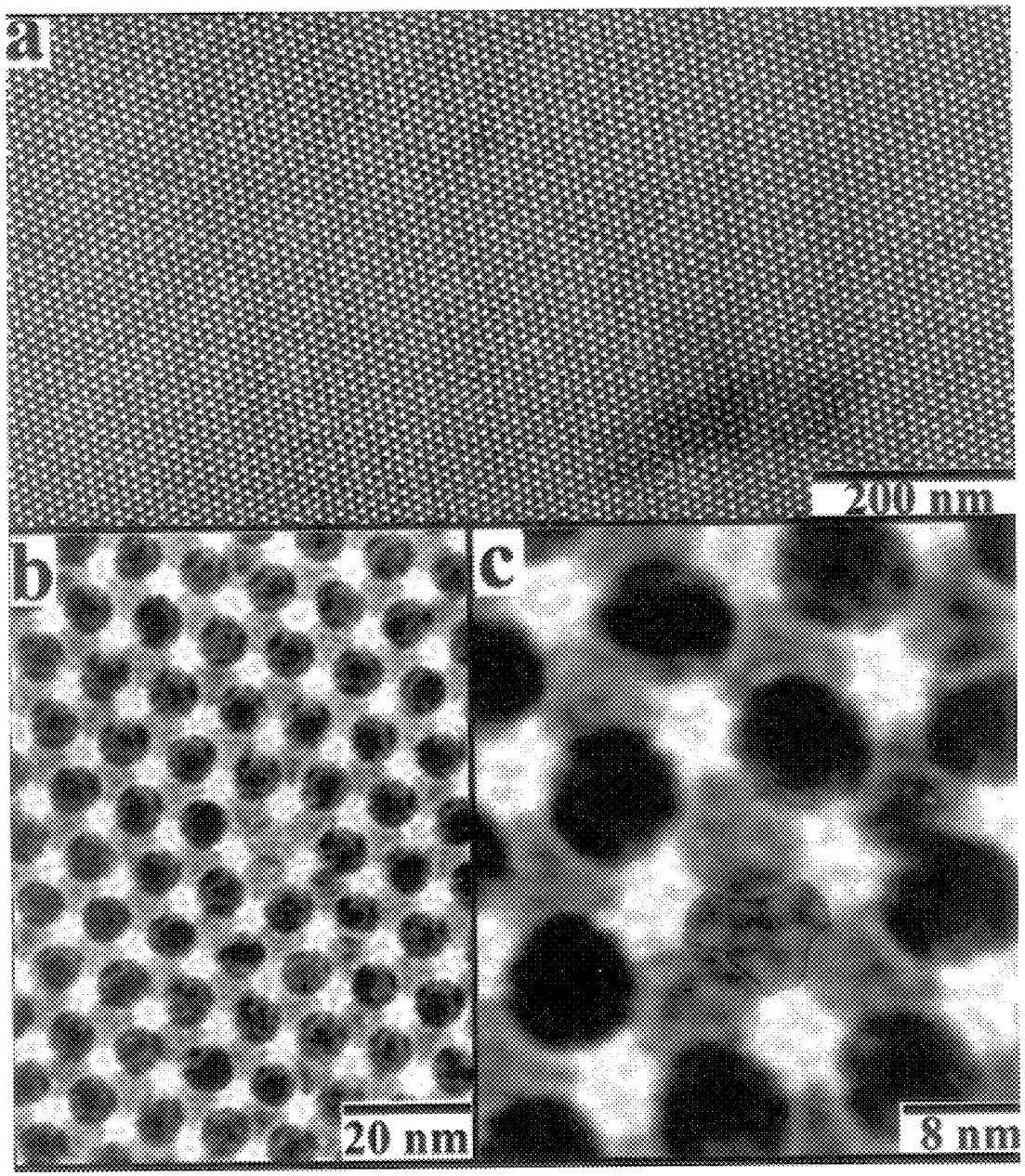
FIG. 14 is a TEM of the particles output from the apparatus of FIG. 13.

FIG. 14 displays the extreme uniformity of the fcc cobalt particles which result from the innovations presented. The high magnification insets in the TEM image of FIG. 14 clearly show the hexagonal close-packing of the nanocrystals, and displays one vacancy in the superlattice which confirms the three-dimensional structure of the assembly by revealing the positions of the underlying particles.

FIG. 15 illustrates a flowchart of the inventive process 150, which represents one of the methods, and FIG. 16 illustrates a second method in the flowchart 160.

In FIG. 15, the inventive method of forming nanoparticles includes a first step 1501 of forming a metal precursor solution together with a surfactants solution. The metal precursor solution is formed from a transition metal. As described above and below in the Examples, the metal precursor solution may be formed from a complex or a salt of the transition metal. In forming the metal precursor solution and surfactants solution together, the metal precursor solution may be injected into the surfactants solution or vice versa, as described above and below in the Examples. The surfactant solution may be preformed at a predetermined temperature (e.g., optimally higher than room temperature). Forming the metal precursor solution and the surfactant solution may be performed at room temperature or at an elevated temperature of between approximately 100° C. to 300° C. and most preferably about 240° C.

In step 1502, the mixture (e.g., the metal precursor solution and surfactants solution) is heated to a temperature of between approximately 100° C. to 300° C., and most preferably about 240° C.

In step 1503, a reducing agent is introduced (e.g., rapidly injected) to the metal precursor solution and surfactants solution.

In step 1504, the mixture is cooled and a flocculent is added, as described above and below in the Examples, to the colloidal dispersion, to cause nanoparticles to precipitate out of solution without permanent agglomeration.

In step 1505, the precipitate (e.g., particles) is separated.

In step 1506, a solvent (e.g., an aprotic hydrocarbon solvent) is added to the precipitate, thereby enabling the precipitate to redissolve (e.g., redisperse or repeptize the nanoparticles).

In step 1507, it is determined whether the size distribution is acceptable. If so, the process ends. If the size distribution is not acceptable, steps 1504–1507 may be repeated as desired to narrow the size distribution.

FIG. 16 illustrates a flowchart of another method of the inventive process of forming nanoparticles which includes a first step 1601 of forming a metal precursor solution from a transition metal. As described above and below in the Examples, the metal precursor solution may be formed from a complex or a salt of the transition metal. Such a step may be performed at room temperature or at an elevated temperature of between approximately 100° C. to 300° C., and most preferably about 240° C.

In step 1602, a surfactant solution is formed and heated, as described above and below in the Examples. The surfactant solution may be preformed at a predetermined temperature (e.g., optimally higher than room temperature).

In step 1603, the metal precursor solution is introduced (e.g., rapidly injected) to the hot surfactant solution. It is noted that instead of introducing (e.g., rapidly injecting) the metal precursor solution to the surfactant solution, the surfactant solution could be introduced (e.g., rapidly injected) to the metal precursor solution.

In step 1604, the mixture (e.g., colloidal dispersion) is cooled, and a flocculent is added thereto, as described above and below in the Examples, for separating the precipitate (particles).

In step 1605, the precipitate is separated. Specifically, the particles (nanoparticles) are precipitated out of solution without permanent agglomeration.

Finally, in step 1606, a solvent (e.g., preferably an aprotic hydrocarbon solvent) is added to the precipitate to redissolve the same (redisperse or repeptize the nanoparticles).

In step 1607, it is determined whether the size distribution is acceptable. If so, the process ends. If the size distribution is not acceptable, steps 1604–1607 may be repeated as desired to narrow the size distribution.

Thus, the method of the present invention offers a unique and unobvious approach to producing monodisperse transition metal nanostructures, as is illustrated by the following examples.

EXAMPLE 1

Monodisperse 6 nm hcp cobalt nanoparticles were synthesized as follows. First, cobalt acetate tetrahydrate/oleic acid/$PR_3$/phenylether in a ratio of 1 mmol/2 mmol/2 mmol/ 10 mL were mixed under a nitrogen atmosphere in a sealed vessel (e.g., as shown in FIG. 11A), and were heated to 240° C. over a period of ~30 minutes. It is noted that a complete dissolution of the metal precursor is indicated by the formation of a clear, dark blue solution.

An 80° C. phenyl ether solution of 1,2-dodecanediol (2.5 equivalent of cobalt was injected rapidly (1–2 seconds) though a septum into metal precursor solution being vigorously stirred (e.g., with either a magnetic stir-bar or a mechanical device) to initiate the reduction of the metal salts. The color of the solution changed from dark blue to black over a period of 5 minutes as the blue cobalt salt species was consumed and the black cobalt metal particles were formed. The black solution was stirred vigorously at 240° C. for a total of approximately 15 minutes, to complete the growth of the particles and then the reaction mixture was cooled to room temperature. After the reaction mixture was cooled below 60° C., methanol was added in a dropwise manner (e.g., as shown in FIG. 12) until an air-stable magnetic black precipitate began to separate from the solution. Then, the precipitate was separated by centrifugation (e.g., as shown in FIG. 12) or filtration after which the supernatant was discarded, and the black waxy magnetic precipitate was redispersed in hexane in the presence of approximately 100 to 500 microliters of oleic acid. Size-selective precipitation was performed by titrating the hexane solution with a short chain alcohol (e.g., methanol, ethanol, propanol, and/or isopropanol, but preferably ethanol).

Magnetic transition metal intermetallics (e.g., CoPt, $Co_3Pt$, etc.) and alloy particles such as, for example, Co/Ni, Ni/Fe or the like, can be synthesized in an analogous procedure in which a mixture of metal salts are used to prepare the metal precursor solution. The phase of the intermetallic particles and the composition of the alloy can be easily adjusted by changing the molar ratio of starting metal salts. Nickel acetate tetrahydrate, iron acetate, and platinum acetylacetonate were used as Ni, Fe, and Pt sources, respectively.

EXAMPLE 2

Monodisperse 8 nm fcc cobalt nanocrystals were prepared as follows. First, under a nitrogen atmosphere, oleic acid/ $PR_3$/phenylether in the ratio of 1 mmol/1 mmol/20 mL, respectively, were mixed and heated to 200° C. over a period of ~30 min. A phenyl ether solution dicobalt octacarbonyl (1 mmol) was injected to the hot mixture as it was undergoing vigorous stirring (e.g., with either a magnetic stir-bar or a mechanical device). A black solution was formed instantly, indicating the decomposition of the carbonyl and the formation of cobalt particles.

The solution was stirred vigorously at 200° C. for a total of 15 minutes, and then cooled to room temperature. Dropwise addition of methanol (e.g., as shown in FIG. 12) produced an air-stable magnetic black precipitate. The air-stable magnetic black precipitate produced was separated by centrifugation or filtration, and the supernatant was discarded. The black magnetic waxy product was redispersed in hexane in the presence of approximately 100 to 500 microliters of oleic acid. Size-selective precipitation was performed by titrating the hexane solution with ethanol.

In contrast to the procedure of Example 1, the procedure of Example 2 provides access to particles with different crystal phases. Additionally, the method of Example 2 provides a better route to different crystal structures and better initial particle size distribution than Example 1, which allows the isolation of monodisperse particles in fewer recursive steps of size selective precipitation.

The improved initial size distribution is attained because the carbonyl decomposition route more closely approaches the idealized growth curve for monodisperse colloids depicted in FIG. 11B. The kinetics of the carbonyl decomposition are much faster than the polyol reduction producing a more temporally discrete nucleation event, and better separation of the nucleation and growth stages of the reaction. The extreme uniformity of the material produce using the carbonyl decomposition procedure is evident in the TEM image of FIG. 14.

In FIG. 14, an ensemble of 8-nm. diameter fcc cobalt particles is seen organized into a regular three-dimensional array (e.g., also referred to as a colloidal crystal or nanocrystal superlattice). A statistical analysis of the particles in the images places a measurement limited standard deviation in particle size to be less than 5% in diameter. The striking regularity of the assembly is a clear indication of the uniformity of the constituent particles.

EXAMPLE 3

Monodisperse 10 nm cubic phase cobalt nanoparticles were produced as follows. First, $CoCl_2$(anhydrous)/oleic acid/tributylphosphine/n-octylether in a ratio of 1 mmol/1 mmol/3 mmol/20 mL, respectively, were mixed under a nitrogen atmosphere, and heated to 200° C. $LiBHEt_3$ (superhydride) (2 mmol) was injected into the hot blue solution under vigorous stirring. A black/brown solution was formed instantly, indicating the reduction of $CoCl_2$ and the formation of cobalt particles. The solution was stirred at 200° C. for approximately 15 minutes and cooled to below 60° C. The addition of ethanol produced an air-stable magnetic black precipitate, as shown, for example, in FIG. 12. The precipitate was separated by centrifugation or filtration, and the supernatant was subsequently discarded. The magnetic waxy product was redispersed in hexane in the presence of approximately 100–500 micro-liters of oleic acid. Size-selective precipitation was performed by titrating the hexane solution with ethanol.

The product of Example 3 yields yet another crystal phase of cobalt particles, thereby allowing more materials choices for various applications. This material displays a crystal symmetry of the β-phase of manganese. This novel phase of cobalt can be transformed subsequently into either the hcp or fcc crystal structures by controlled annealing. Heating the (β-manganese) nanoparticles at temperatures lower than 400° C. converts the material to predominantly hcp particles (e.g., hcp is the preferred bulk phase below 425° C.). If the annealing is performed at temperatures above 400° C., the nanoparticles produced by the process of Example 3 convert to fcc particles (e.g., the stable bulk phase at temperatures above 425° C.). The diffraction patterns of FIG. 2B document the structural transitions.

The kinetics of the alkyloborohydride reduction and rate are similar to the carbonyl decomposition (method of Example 2), but are much faster than the polyol reduction (e.g., method of Example 1), thereby producing a temporally discrete nucleation event, and good separation of the nucleation and growth stages of the reaction. The extreme uniformity of the material produced using the superhydride reduction procedure is evident in the TEM image of FIG. 4.

In FIG. 4, an ensemble of 8-nm. diameter cobalt particles is seen organized in to a regular three-dimensional array (e.g., also referred to as a colloidal crystal or nanocrystal superlattice). The statistical analysis of the particle in the images places a measurement-limited standard deviation in particle size to be less than 5% in diameter. Once again, the striking regularity of the assembly is a clear indication of the uniformity of the constituent particles.

EXAMPLE 4

For Ag-coated cobalt particles, the process was as follows. First, cobalt particles synthesized as above (e.g., as in any of methods of Examples 1, 2, or 3) were redispersed in phenyl ether under $N_2$. $AgNO_3$ 1,2-dodecanediol (one equivalent of $AgNO_3$) were added to the dispersion. The mixture was stirred mechanically or magnetically at room temperature for about 10 minutes to ensure complete dissolution of the reagents. Then, the temperature was slowly raised to 100° C. in a period of 20 minutes with continuous stirring and held at 100° C. for 10 minutes.

After being cooled down to room temperature, the mixture was treated with methanol, which produced an air-stable black-brown precipitate, and the mixture underwent centrifugation. The supernatant was discarded after centrifugation. The product was redispersed in hexane in the presence of about 100–500 microliters of oleic acid. Size-selective precipitation was performed by titrating the hexane solution with ethanol.

A similar procedure can be used to prepare Pd- and Pt-coated Co particles and other ferromagnetic metal-based (e.g., such as Ni-based), over-coated nanocrystals. Merely by substituting the $AgNO_3$ for Pd(acetate), Pt(acetate) and nickel acetate, respectively, the resulting particles each have a surface shell of the less chemically-active metal which improves the corrosion resistance of the particles and allows new chemical groups to be bound to the surface.

This ability to change the surface chemistry of the particles facilitates the attachment of new biologically active groups through a sulphide linkage. The use of Au and Ag nanoparticles with sulphide-linked biomolecules is well established and, with the procedure outlined above, all of the existing technology in this area can be exploited to derivate the surface of the magnetic core-shell structure for biological tagging and separation applications.

Thus, as is clear from the above description and the Examples, the present invention provides a method for the chemical synthesis of magnetic transition metal nanocrystals (colloids) and their assembly into two- and three-dimensional ordered lattices and a method for the use of the dispersed colloids and ordered lattices.

More specifically and as described above, the present invention provides a method for the chemical synthesis of magnetic transition metal colloids (e.g., such as Co, Fe, Ni and alloys thereof such as $Co_xFe_{(1-x)}$, $Co_xNi_{(1-x)}$ and $Fe_xNi_{(1-x)}$, wherein x is within a range of 0 to 1 mole fraction, and $Co_xFe_yN_z$ where x+y+z=1 (mole fraction) and with a diameter in the range of approximately 1–20 nm in size with a standard deviation in size of 5% in diameter or less. As described above, the invention employs these unusually uniform dispersed magnetic nanocrystals with significant benefit in a range of applications where currently less uniform colloidal or granular magnetic material is employed.

While the invention has been described in terms of several preferred embodiments, those skilled in the art will recognize that the invention can be practiced with modification within the spirit and scope of the appended claims.

For example, there are many useful applications of both dispersed magnetic nanocrystals and organized thin films of the nanocrystals, and thus the uses described above should not be construed as limiting the invention in any way.

Specifically, the uniform magnetic colloids can be utilized in the dispersed state as magnetic ink or in engineering applications including magnetorheological fluids (e.g., ferrofluids), as electromagnetic tags for interrogation of composite materials, as remote heat sources when under the influence of electromagnetic radiation near the ferromagnetic resonance frequency of the individual particles, and as the active light modulator in a magnetopheretic display.

Several important applications in the life sciences also are envisaged for the dispersed magnetic nanocrystals as contrast-enhancing agents in magnetic resonance imaging (MRI), remote heat sources for hyper-thermal destruction of tissue under the influence of an external electromagnetic field, an externally-triggered drug delivery vehicle, selective magnetic labels in high gradient magnetic separation of purification/isolation biomolecules and cellular products, and for use in medical diagnosis through the selective isolation of biological products which are considered indicative of the presence of disease or bodily dysfunction.

Organized assemblies of the magnetic nanocrystals have significant potential as high density magnetic recording media (e.g., tapes, flexible disks, rigid disks, magnetic smart cards and the like). Close-packed assemblies of these magnetic nanocrystals are envisioned as the active magnetoresistive medium in two components of nonvolatile magnetic storage technologies, as the magnetoresistive medium in magnetic sensors (e.g., read heads) exploiting the modulation spin-dependent hopping/tunneling between neighboring nanocrystals in the presence of a modulated external magnetic field or in proximity to a magnetic encoded pattern.

Assemblies of uniform magnetic nanocrystals also are envisioned as the active elements in the channel of transistors for non-volatile magnetic random access memory in which the spin-dependent (magnetoresistive) and hysteretic properties of the nanocrystals are simultaneously exploited. For example, a strong magnetic field (e.g., produced by write pulses or the like) is generated by on-chip current flow which is sufficient to orient the magnetic polarization of the nanocrystals in the channel.

Having thus described our invention, what we claim as new and desire to secure by Letters Patent is as follows:

1. A method of forming nanoparticles, comprising:

forming a metal precursor solution from a transition metal; introducing said metal precursor solution to a surfactant solution, wherein said forming and introducing performed in an inert atmosphere with the exclusion of oxygen, said surfactant solution comprises a combination of an organic stabilizer and a phosphine to protect said nanoparticles, and said organic stabilizer being a long chain organic compound of the form R—X, where R is a member selected from the group consisting of 1) a hydrocarbon chain in straight or branched formation, said hydrocarbon chain comprising 6 to 22 carbon atoms, and 2) a fluorocarbon chain in straight or branched formation, said fluorocarbon chain comprising 6 to 22 carbon atoms, and where X is selected from the group consisting of carboxylic acid, phosphoric acid, phosphinic acid, sulfonic acid, sulfinic acids, and thiol adding a flocculent to cause nanoparticles to precipitate out of solution without permanent agglomeration; and adding a hydrocarbon solvent for one of redispersing and repeptizing said nanoparticles.

2. The method according to claim 1, wherein said forming a metal precursor solution includes forming a metal precursor solution as a complex of the transition metal at a first temperature, said first temperature being room temperature.

3. The method according to claim 2, wherein said hydrocarbon solvent includes one of phenylether and n-octylether, said nanoparticles being cobalt-based nanoparticles, and wherein a range of said first temperature is substantially between approximately 100° C. to approximately 300° C.

4. The method according to claim 1, wherein said forming a metal precursor solution comprises a step of forming a metal precursor solution from a salt of the transition metal, an ionic surfactant, and an inert solvent at approximately 240° C.

5. The method according to claim 1, wherein said forming a metal precursor solution includes forming a metal precursor solution from a salt of a transition metal, an ionic surfactant, and an inert high boiling point solvent at a first temperature.

6. The method according to claim 5, wherein said forming a metal precursor solution includes forming a metal precursor solution from a salt of a transition metal, an ionic surfactant, and an inert solvent at approximately 240° C.

7. The method according to claim 1, wherein said forming a metal precursor solution is performed at a first temperature and said step of introducing said metal precursor to said surfactant solution is performed at a second temperature.

8. The method according to claim 7, wherein said first temperature is a room temperature and said introducing is performed at a temperature substantially within a range of approximately 200° C. to approximately 300° C.

9. The method according to claim 8, wherein said step of introducing is performed at a temperature of about substantially 240° C.

10. The method according to claim 7, wherein said first temperature is a temperature substantially within a range of approximately 200° C. to approximately 300° C., and said second temperature is less than 240° C.

11. The method according to claim 10, wherein said first temperature is substantially about 240° C.

12. The method according to claim 7, wherein said forming a metal precursor solution includes forming a metal precursor solution from a salt of a transition metal, an ionic surfactant, and an inert solvent.

13. The method according to claim 1, wherein a long chain diol is used for reducing cobalt salts to provide hexagonally-close-packed (hcp) cobalt nanoparticles, wherein the diol includes one of 1,2-octanediol, 1,2-dodecanediol and 1,2-hexadecanediol, wherein cobalt acetate tetrahydrate and cobalt acetylacetonate are used as a cobalt source.

14. The method according to claim 1, wherein said metal precursor solution includes a metal system essentially comprising one of $Ni(Ac)_{2-4}H_2O$, $NiCl_2$ $Cu(Ac)_2H_2O$, $Cu(acac)_2$, $Pd(Ac)_2$, $PdCl_2$, $Ag(Ac)$, $AgNO_3$, and $PtCl_2$.

15. The method according to claim 1, wherein said nanoparticles comprise cobalt-based nanoparticles, and said surfactant solution includes dicobalt octacarbonyl, a decomposition of said dicobalt octacarbonyl providing face-centered cubic (fcc) cobalt nanocrystals.

16. The method according to claim 1, wherein said adding a hydrocarbon solvent includes reduction of cobalt chloride by superhydride resulting in forming cubic phase cobalt nanoparticles, wherein said superhydride is one of tetrahydrofuran, phenylether, and octylether.

17. The method according to claim 1, wherein said adding a hydrocarbon solvent includes reduction of a metal system by superhydride resulting in forming said nanoparticleds, wherein said superhydride is dissolved in one of tetrahydrofuran, phenylether, and octylether, wherein said metal system includes one of $Co(Ac)_{2-4}H_2O$, $NiCl_2$ $(H_2O)$, $NiAc_{2-4}H_2O$, $CuCl_2$ $(H_2O)$, $PdCl_2$, $PdAc_2$, $AgAc$, $AgNO_3$, and $PtCl_2$.

18. The method according to claim 1, wherein a sequential reduction of a metal salt and a noble metal salt is performed to provide noble-metal coated particles.

19. The method according to claim 1, wherein said phosphine comprises a trialkylphosphine and wherein particle size of said nanoparticles is controlled by changing a ratio of said organic stabilizer and siad trialkylphosphine.

20. The method according to claim 1, wherein said nanoparticles include an acid and an acetylamide ligand therearound.

21. The method of claim 1 further comprising varying a ratio of the organic stabilizer and the phosphine in order to produce the nanoparticles with a desired particle size.

22. A method of forming nanoparticles comprising:

forming a metal precursor solution as a complex of a transition metal at a first temperature, forming a surfactant solution at a second temperature higher than said first temperature, said surfactant solution comprises a combination of an organic stabilizer and a phosphine to protect said nanonarticles, and said organic stabilizer being a long chain organic compound of the form R—X, where R is a member selected from the group consisting of 1) a hydrocarbon chain in straight or branched formation. said hydrocarbon chain comprising 6 to 22 carbon atoms, and 2) a fluorocarbon chain in straight or branched formation, said fluorocarbon chain comprising 6 to 22 carbon atoms, and, where X is selected from the group consisting of carboxylic acid, phosphoric acid, phosphinic acid. sulfonic acid, sulfinic acids, and thiol;

introducing said metal precursor solution to said surfactant solution, to form a mixture, wherein said forming the surfactant solution and said introducing is performed in an inert atmosphere without the presence of oxygen;

adding a flocculent to said mixture to cause nanoparticles to precipitate out of solution without permanent agglomeration; and adding a hydrocarbon solvent for one of redispersing and repeptizing said nanoparticles.

23. The method according to claim 22, wherein said first temperature is room temperature and said second temperature is approximately 240° C.

24. The method according to claim 22, wherein said surfactant solution includes an inert solvent comprising a high boiling point solvent having a boiling point substantially within a range of approximately 200° C. to approximately 300° C., and said second temperature is approximately 240° C.

25. The method according to claim 24, wherein said solvent comprises ether.

26. The method according to claim 25, wherein said metal precursor solution is formed at room temperature.

27. The method according to claim 22, wherein said surfactant solution includes at least one ionic surfactant, one neutral surfactant, and an inert solvent.

28. The method according to claim 27, wherein said solvent comprises ether, and wherein said first temperature is room temperature and said second temperature is approximately 240° C.

29. The method according to claim 22, wherein said nanoparticles comprise cobalt-based nanoparticles.

30. A method of forming nanoparticles comprising:

forming a metal precursor solution at a first temperature, said metal precursor solution containing a surfactant solution comprises a combination of an organic stabilizer and a phosphine to protect said nanoparticles, and said organic stabilizer being, a long chain organic compound of the form R—X, where R is a member selected from the group consisting of 1) a hydrocarbon chain in straight or branched formation, said hydrocarbon chain comprising 6 to 22 carbon atoms, and 2) a fluorocarbon chain in straight or branched formation, said fluorocarbon chain comprising 6 to 22 carbon atoms, and where X is selected from the group consisting of carboxylic acid, phosphoric acid, phosphinic acid, sulfonic acid, sulfinic acids, and thiol;

introducing a reducing agent at a second temperature into said metal precursor solution, wherein said forming and said introducing is performed with the exclusion of oxygen in an inert atmosphere;

adding a flocculent to cause nanoparticles to precipitate out of solution without permanent agglomeration; and adding a hydrocarbon solvent for one of redispersing and repeptizing said nanoparticles.

31. The method according to claim 30, wherein said first temperature is approximately 240° C. and said second temperature is less than approximately 240° C.

32. The method according to claim 30, wherein said forming a metal precursor solution includes forming a metal precursor solution from a salt of a transition metal, an ionic surfactant, and an inert solvent at a temperature in a range of approximately 100° C. to approximately 300° C.

33. The method according to claim 32, wherein said solvent comprises ether.

34. The method according to claim 32, wherein said hydrocarbon solvent includes one of phenylether and n-octylether, said nanoparticles being cobalt-based nanoparticles, and wherein a range of said first temperature is substantially between approximately 100° C. to approximately 300° C.

35. The method according to claim 30, wherein said second temperature is room temperature.

36. The method according to claim 30, wherein said metal precursor solution is formed at room temperature.

37. The method according to claim 30, wherein said nanoparticles comprise cobalt-based particles.

38. A method of forming nanoparticles, including: forming a metal salt precursor solution containing a surfactant in a non-reactive solvent, said surfactant solution comprises a combination of an organic stabilizer and a phosphine to protect said nanoparticles, and said organic stabilizer being a long chain organic comnound of the form R—X, where R is a member selected from the group consisting of 1) a hydrocarbon chain in straight or branched formation, said hydrocarbon chain comprising 6 to 22 carbon atoms, and 2) a fluorocarbon chain in straight or branched formation, said fluorocarbon chain comprising 6 to 22 carbon atoms, and where X is selected from the group consisting of carboxmlic acid, phosphoric acid, phosphinic acid, sulfonic acid, sulfinic acids, and thiol;

injecting an agent into the solution to reduce the metal salt in situ to produce colloidal metal particles, wherein said forming and iniecting is performed in an inert atmosphere with the exclusion of oxygen;

adding a flocculent to cause nanoparticles to precipitate out of solution without permanent agglomeration and separating by-products of synthesis which remain in solution; and adding a hydrocarbon solvent to the nanoparticles precipitated out, to one of redisperse and repeptize the nanoparticles.

39. The method according to claim 38, wherein the surfactant comprises at least one of an alkylphosphine and an organic stabilizer, said organic stabilizer comprising a long chain organic compound of the form R—X, where R is a member selected from the group consisting of 1) a hydrocarbon chain in straight or branched formation, said hydrocarbon chain comprising 6 to 22 carbon atoms, and 2) a fluorocarbon chain in straight or branched formation, said fluorocarbon chain comprising 6 to 22 carbon atoms, and where X is selected from the group consisting of carboxylic acid, phosphoric acid, phosphinic acid, sulfonic acid, sulfinic acids, and thiol.

40. A method of forming nanoparticles, comprising:

forming a metal precursor solution from a transition metal;

introducing said metal precursor solution to a surfactant solution, wherein said forming and introducing is performed in an inert atmosphere with the exclusion of oxygen;

adding a flocculent to cause nanoparticles to precipitate out of solution without permanent agglomeration; and adding a hydrocarbon solvent for one of redispersing and repeptizing said nanoparticles, wherein said nanoparticles comprise cobalt-based nanoparticles, and a combination of carboxylic acid and trialkylphosphine are used to protect said cobalt-based nanoparticles, and wherein a particle size is controlled by changing a ratio of said acid and said trialkylphosphine, the acid being RCOOH with R equal to one of $C_{12}H_{24}$, $C_{17}H_{34}$, and $C_{21}H_{42}$ and the trialkylphosphine being organophosphine with R being one of Phenyl, $C_2H_5$, $C_4H_9$, and $C_8H_{17}$.

41. A method of forming nanoparticles, comprising:

forming a metal precursor solution at a first temperature approximately 240° C.;

introducing a reducing agent at a second temperature less than approximately 240° C. into said metal precursor solution, wherein said forming and said introducing is performed with the exclusion of oxygen in an inert atmosphere;

adding a flocculent to cause nanoparticles to precipitate out of solution without permanent agglomeration; and adding a hydrocarbon solvent for one of redispersing and repeptizing said nanoparticles, wherein said nanoparticles comprise cobalt-based nanoparticles, and a combination of carboxylic acid and trialkylphosphine are used to protect said cobalt-based nanoparticles, and wherein a particle size is controlled by changing a ratio of said acid and said trialkylphosphine, the acid being RCOOH with R equal to one of $C_{12}H_{24}$, $C_{17}H_{34}$, and $C_{21}H_{42}$ and the trialkylphosphine being organophosphine with R being one of Phenyl, $C_2H_5$, $C_4H_9$, and $C_8H_{17}$.

42. A method of forming nanoparticles, comprising:

forming a metal salt precursor solution containing a surfactant comprises at least one of a tertiary alkylphosphine and oleic acid;

injecting an agent into the solution to reduce the metal salt in situ to produce colloidal metal particles, wherein said forming and injecting is performed in an inert atmosphere with the exclusion of oxygen;

adding a flocculent to cause nanoparticles to precipitate out of solution without permanent agglomeration and separating by-products of synthesis which remain in solution; and adding a hydrocarbon solvent to the nanoparticles precipitated out, to one of redisperse and repeptize the nanoparticles.

43. A method of forming nanoparticles, comprising:

forming a metal precursor solution from a transition metal;

introducing said metal precursor solution to a surfactant solution, wherein said forming and introducing performed in an inert atmosphere with the exclusion of oxygen, said surfactant solution comprises a combination of a nonionic surfactant and an ionic surfactant to protect said nanoparticles;

adding a flocculent to cause nanoparticles to precipitate out of solution without permanent agglomeration; and adding a hydrocarbon solvent for one of redispersing and repeptizing said nanoparticles, wherein said nonionic surfactant is a phosphine and said ionic surfactant is an organic stabilizer being a long chain organic compound of the form R—X, where R is a member selected from the group consisting of 1) a hydrocarbon chain in straight or branched formation, said hydrocarbon chan comprising 6 to 22 carbon atoms, and 2) a fluorocarbon chain in straight or branched formation, said fluorocarbon chain comprising 6 to 22 carbon atoms, and where X is selected from the group consisting of carboxylic acid, phosphoric acid, phosphinic acid, sulfonic acid, sulfinic acids, and thiol.

* * * * *